*INVENTORS*
ROBERT WERNIKOFF
PAUL EPSTEIN
WILLIAM F. SCHRIBER

BY Rines and Rines

ATTORNEYS

METHOD OF AND APPARATUS FOR CODE COMMUNICATION

INVENTORS
ROBERT WERNIKOFF
PAUL EPSTEIN
WILLIAM F. SCHRIBER
BY Rines and Rines
ATTORNEYS July 23, 1968 R. WERNIKOFF ET AL 3,394,352

METHOD OF AND APPARATUS FOR CODE COMMUNICATION

Filed July 22, 1965 8 Sheets-Sheet 3

INVENTORS:
ROBERT WERNIKOFF
PAUL EPSTEIN
WILLIAM SCHREIBER
BY
By Pennie and Pennie
ATTORNEYS INVENTORS:
ROBERT WERNIKOFF
PAUL EPSTEIN
WILLIAM F SCHRIRER
BY Pines and Pines
ATTORNEYS July 23, 1968 R. WERNIKOFF ET AL 3,394,352

METHOD OF AND APPARATUS FOR CODE COMMUNICATION

Filed July 22, 1965 8 Sheets-Sheet 5

INVENTORS:
ROBERT WERNIKOFF
PAUL EPSTEIN
WILLIAM F. SCHRIBER

BY Rines and Rines
ATTORNEYS

METHOD OF AND APPARATUS FOR CODE COMMUNICATION

Filed July 22, 1965 8 Sheets-Sheet 6

INVENTORS
ROBERT WERNIKOFF
PAUL EPSTEIN
WILLIAM SCHREIBER

BY Rines and Rines
ATTORNEYS

July 23, 1968 R. WERNIKOFF ET AL 3,394,352

METHOD OF AND APPARATUS FOR CODE COMMUNICATION

Filed July 22, 1965 8 Sheets-Sheet 7

INVENTORS
ROBERT WERNIKOFF
PAUL EPSTEIN
WILLIAM SCHREIBER

By Rines and Rines
ATTORNEYS

*INVENTORS*
ROBERT WERNIKOFF
PAUL EPSTEIN
WILLIAM F. SCHRIBER
BY Rines and Rines
*ATTORNEYS*

United States Patent Office 3,394,352
Patented July 23, 1968

3,394,352
METHOD OF AND APPARATUS FOR CODE COMMUNICATION

Robert Wernikoff, Cambridge, Paul Epstein, Brookline, and William F. Schreiber, Lexington, Mass., assignors to Electronic Image Systems Corporation, Boston, Mass., a corporation of Massachusetts Filed July 22, 1965, Ser. No. 474,189
35 Claims. (Cl. 340—172.5)

ABSTRACT OF THE DISCLOSURE

The methods and apparatus disclosed minimize the number of symbols to be transmitted, and hence the transmission time, in a communication system, by determining the most efficient code for encoding sequences of message symbols and transmitting the symbols in that code. Determination of the most efficient code can be accomplished by applying the message symbols to a plurality of encoders, counting the numbers of symbols of coded representations of successive message symbols produced by each encoder, and comparing the numbers to determine the particular code that introduces the smallest number of symbols of coded representation consistent with distortionless message transmission. Tagging symbols are transmitted to permit reconstruction of the original message symbols from the transmitted coded symbols. In an application of the invention to facsimile transmission run-length coding is employed.

The present invention relates to methods of and apparatus for code communication, being more particularly, though not in all cases exclusively, directed to efficient coding for inhomogeneous sources of information.

The problem of processing information-to-be-communicated so as to enable a minimum number of symbols to be transmitted with reliable recovery of the information has long challenged the art. In devising his telegraphic code more than a century ago, Samuel F. B. Morse generally assigned the shortest code symbols to the most frequently used English alphabet letters in order to economize on the transmission time of messages. Had Morse optimized the assigning of the shorter code symbols to the more frequent letters, this would have produced about a fifteen percent saving in transmission time over assigning symbols of equal length to all letters. Far greater saving, however, could have been effected by assigning code symbols, not for individual letters, but for pairs, triplets or other grouping of letters that in normal text occur much more frequently than others. Within recent years, indeed Claude Shannon has estimated that the maximum saving in transmission capacity that can be obtained through optimum ecoding of English text is about seventy-five percent when statistical dependences between successive letters of text, carried out to one hundred letters, are considered.

When the symbols issuing from the information source are statistically dependent upon one another, so that certain groupings of symbols occur more frequently than others, efficient coding requires that the symbols be considered not singly but in groups. The number of elements of which the group must consist is dictated by the range of substantial statistical dependence. It might amount to ten or twenty letters in English text, and to several thousand bits in pictorial transmission. The size of the code book in which groups of source symbols are assigned code symbols increases fantastically as the group is made larger (the number of entries in the code book is $27^{10}=205,900,000,000,000$ for groups of ten English letters, and it is the square of that number for groups of twenty letters) and this growth soon becomes an insurmountable practical limitation to optimum coding. There are no non-singular codes that circumvent this problem.

An optimum code is matched as closely as possible to the statistical peculiarities of the population or set of sequences to be encoded. A code designed to match the letter frequencies of English text, for example, becomes quite inefficient when it is applied to a different population or set of sequences, such as a foreign language. Whenever dissimilar populations are mixed (for example, for the purpose of obtaining a single set of letter frequencies applicable to English and to a foreign language simultaneously) the frequencies of the letters tend to equalize; and any operation on sequences that equalizes probabilities reduces the possible compression. In the limit, indeed, if an information source is as likely to produce one symbol as another, and if successive symbols do not depend on previous ones, then no compression whatsoever is possible. The reduction of transmission time by means of coding is thus possible only to the extent that the statistics of the strings of symbols produced by information sources differ from independence and equiprobability. The recipe for the optimum code is fixed in a deterministic, mathematical way by the precise probability distributions that describe the information source.

While it is difficult to reconcile language text, television, moving pictures, facsimile, telemetered data, etc., with the mathematical idea of a homogeneous population with a fixed, immutable and known frequency distribution, yet this abstract concept underlies all prior coding theory.

In accordance with Shannon's theorem, an information source is contemplated that produces sequences of symbols (but not just any sequence) that may be regarded as random samples from a homogeneous population with known and immutable frequency distributions of all orders (i.e., for pairs of symbols, triplets, . . . . $n$-tuples). The term "homogeneous" (the technical word is "ergodic") implies that any sufficiently long sequence from the source is very likely to be representative of any other source sequence.

Adherence to this framework has, however, resulted in prior-art coding and compression systems that fall far below the ultimate transmission efficiency. The reason is that the mathematical framework on which they are based does not sufficiently resemble reality. In accordance with the present invention, on the other hand, as pragmatically determined from actual experiment, it is not assumed that the population of symbols (letters of text, or elements of television or facsimile pictures, for example) is a homogeneous source in the sense of information theory; but, rather, that inhomogeneous sources are involved requiring a novel coding logic that has been found in practice to more than double the average compression attained by prior-art systems implementing conventional coding theory, and with less equipment. In addition, the coder for inhomogeneous sources, underlying the invention, results in a transmission time that never exceeds the uncoded time and sometimes is fifty times smaller.

An object of the invention, thus, is to provide a new and improved method of and apparatus for code communication that is not subject to the above-described disadvantages of prior-art coding and compression systems, predicated upon conventional coding theorems; but that, to the contrary, provides for greater transmission-time efficiency and with less complicated and costly apparatus.

A further object is to provide a new and improved scanning transmission and reception system for such purposes as facsimile or other communication, all generically referred to as "picture" scanning and the like.

Still another object is to provide each of a novel code transmission and reception apparatus.

Other and further objects will be made apparent hereinafter and are more particularly pointed out in the appended claims.

The invention will now be described in connection with the accompanying drawings, FIG. 1A of which is a schematic block diagram of a portion of a transmitter useful with the invention;

Considering for purposes of illustration an information source that produces sequences drawn not necessarily from one homogeneous population, but possibly from several different populations, some known and others perhaps not yet identified, and considering that the source may switch from one population to another at random and without stopping; that the different populations are used in unknown, and maybe even in variable proportions; and that switching from one population to the next occurs at random times, an example of the method underlying the present invention may be constructed as follows. For purposes of illustration only, it may be considered that this operation occurs when different-language messages are successively transmitted from United Nations Headquarters.

Since it is known how to gain a useful compression in any one language (or, more generically, population), it is proposed to construct an apparatus that effectively has a collection of encoders, one matched to each language (or population). Then, as the source switches around from one language (or population) to the next, the apparatus automatically follows and, at each instant, uses the code best suited to the output of the source. Each time the coder switches codes, it sends a special signal to the receiver indicative of the code of the following message, so that the receiver can apply the corresponding decoding procedure and recover the original message. The problem is, however, to enable the coder to determine when the source switches populations. The coder must determine this as soon as possible, so that it may switch codes promptly before any great loss in transmission efficiency has been incurred.

What makes the problem difficult is that the conditions of this oversimplified illustration, in which it is possible to think of the source as switching around among a finite and definite number of discrete populations, are not often realized in practice. It is more usual to find real sources changing their behavior in a continuous way, and to find the statistics of the corresponding source sequences assuming a continuum of values; thus there does not exist, even in principle, a unique, well-defined time at which codes should be switched. The present invention provides the solution both for the simple case of switching among discrete sources and for the more important and realistic case of gradually changing source statistics; but the method and apparatus of the invention are more clearly understandable if initially described in terms of the simpler case.

Figures 1A, 1B:
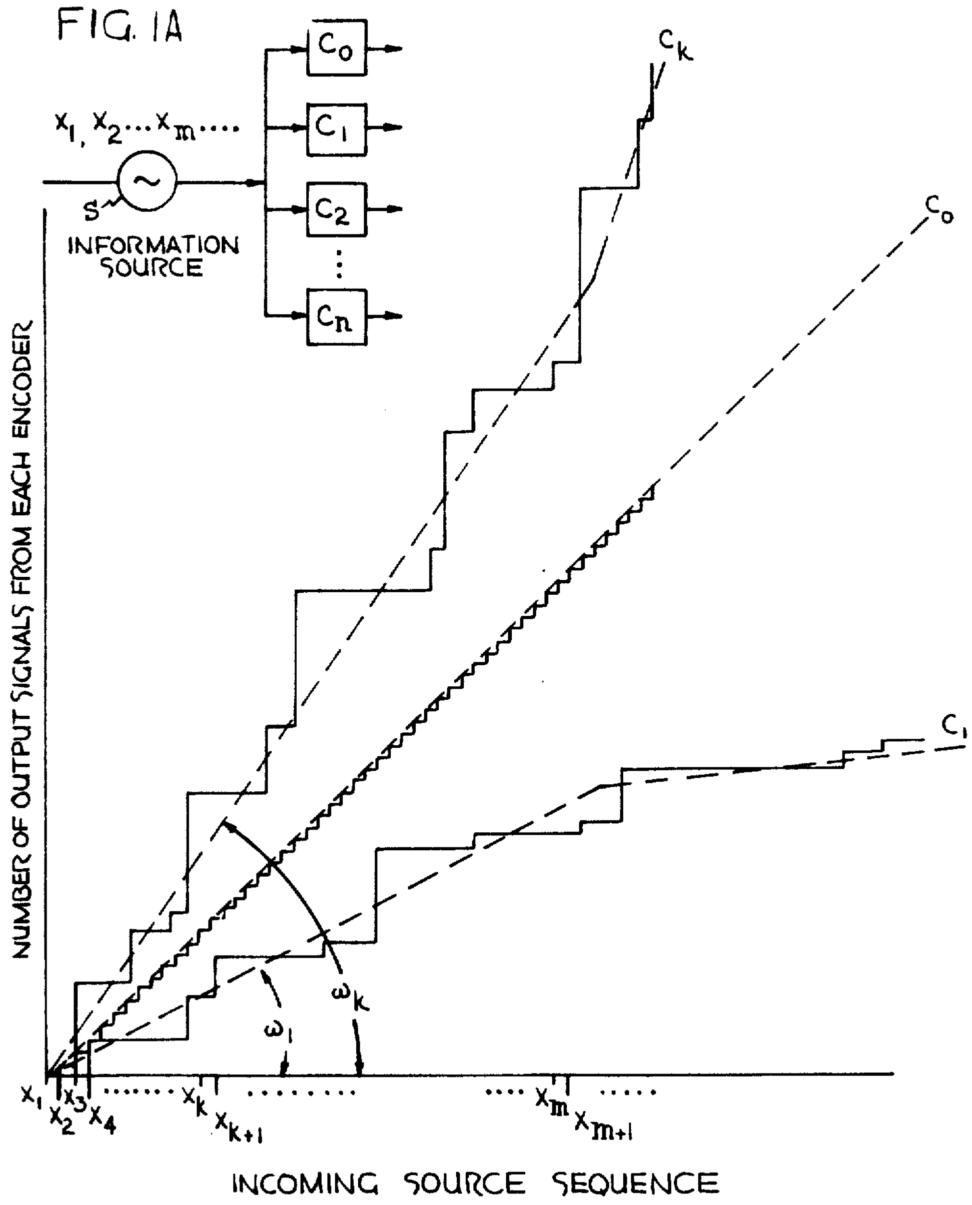
FIG. 1B is a graph illustrative of the performance of the system of FIG. 1A.

Since it is not known which population the source is currently drawing its sequence from, according to the present invention, the message sequence from the information source is fed simultaneously to all encorders. Thus, in FIG. 1A, the sequence of information source symbols $x_1, x_2 \ldots x_m \ldots$ is shown fed from the source S to each of the different encoders or coders $C_0, C_1, C_2 \ldots C_n$. In view of the fact that all possible source populations are not known, it is useful to include one encoder $C_0$ that performs pure, uncoded transmission; its output is identical with its input. We shall call this the null encoder. As each successive source symbol enters a given encoder, the encoder output (which may differ from all the rest) will be of several different types. The output may be "no" symbols (if that particular code works on blocks or source symbols, and the end of the block hasn't been reached yet); or it may be one symbol (as in the null encoder $C_0$ and others); or it may be many symbols (as in a coder that has reached the end of a block or of a run of source symbols). In FIG. 1B, accordingly, there are plotted the numbers of symbols issuing from each coder as successive source symbols enter it from the source S.

If the population statistics are truly stationary, each coder will be characterized by an average straightline behavior whose slope $\omega$ determines the compression (or expansion) produced by that code. The null encoder $C_0$ has unit slope if the input and output alphabets are the same, because it puts out one symbol for each successive input symbol. If the input and output alphabets are different, the one at the input having $A_i$ letters and the one in the output $A_0$ letters, then the previous statement is still correct after all ordinate values have been divided by log $A_i$/log $A_0$. In the sequel, it is tacitly assumed that the alphabets are equal or that the indicated normalization has been done, particularly since a change in alphabets does not change the channel capacity required for message transmission and hence does not affect efficiency.

Coder $C_1$ in FIG. 1A may, as an illustration, produce on the average fewer symbols than enter it; thus, it produces a characteristic shown in FIG. 1B of slope $\omega_1<1$. Coder $C_k$, on the other hand, may produce on the average more than one symbol per input symbol, producing a slope $\omega_k>1$. These statements apply to the average behavior of the coders, shown as the dash lines in FIG. 1B. The actual number of output symbols put out by each coder for each input or arriving source symbol is, of course, a random variable whose value depends on the specific source symbol that entered the coder (these symbols are themselves random variables) and on the source symbols that entered the coder earlier. The actual number of symbols issuing from each coder, as represented by the solid lines in FIG. 1B, thus, is a random walk or step-curve about which the most that can be said, in general, is that it is monotonic nondecreasing.

When the source S abruptly switches populations, so that the source sequence has entirely different statistics, the dash-line curves of FIG. 1B that describe the average behavior of the coders will abruptly change slope, since a coder which formerly was quite efficient ($\omega<1$) may now be very inefficient ($\omega>1$). Automatic code-switching can be based on detecting changes in slope in the average behavior of the coders (i.e., the ratio of output to input symbols or the number of output symbols per unit of real time) and such operation in the system of the invention is for some purposes feasible; but it is preferred, because the average behavior is not known with any acceptable accuracy unless the source persists in its new behavior for a very long time, not to rely upon mere slope detection. What is really available, as opposed to merely assumed, is the actual output from each coder; i.e., the solid-line step curves of FIG. 1B. The randomness of these curves makes the measurement of slopes unreliable, and masks the precise point at which the switch in populations occurred; and there is, in fact, no such point with real sources, whose population parameters change gradually, rather than abruptly. Thus any code-switching systems based on slopes or other population averages, such as entropy, would at best merely be crude approximations.

In accordance with the preferred form of the present invention, therefore, the code-switching logic is based, not on abstract constructs like average slopes or on unsupported assumptions about physical sources, but on the final goal of the coding system, which is to transmit as few symbols as possible without distorting the information produced by the source. Attention is thus focussed on the symbol counts at the outputs of the encoders; and at any given time, that encoder is chosen which leads to the fewest transmitted symbols. This operation can be implemented in a manner now to be described.

Each time the transmitter S switches codes, it must convey this fact to the receiver; that is, the transmitter must tell the receiver which code it will be using next. The accomplishment of this function requires transmitting a few symbols, representative of the name of the new code. If the transmissions are in binary alphabet, then it takes one symbol to identify one out of two possible codes; two symbols to identify one out of four possible codes; three symbols for eight possible codes; and so on. Each additional symbol doubles the number of codes that can be identified. With a quaternary alphabet, one symbol identifies one of four codes; two symbols, one of sixteen codes; and so on. Each additional symbol quadruples the number of codes that can be so identified. Since, in most applications, it is unlikely that a practical system would have more than a dozen or two different codes, it never takes more than three or four symbols to identify the new code. The receiver, however, is confronted with a continuing stream of symbols and it will not be able to distinguish between ordinary message symbols and code-switching instructions unless special provision is made to provide such instructions in an unambiguous manner. This may be done by inserting in the message stream a uniquely-decipherable tagging word which is the same in all codes and which informs the receiver that the immediately following symbols define the new code. To effect this requires a few symbols, say ten or so. The switching signal, therefore, may consist altogether of fifteen symbols or so, this being short compared with most intervals or source homogeneity. Since some transmission time is consumed by sending instruction or tagging words, however, the number of transmitted instruction or tagging symbols must be noted.

In fact, in accordance with the invention, it is the transmission cost of the instruction or tagging symbols that supplies the discriminant for the code-switching decision; that is, codes are switched precisely then, when what is saved in transmission cost by replacing the old code with a new one just exceeds the cost of sending the instruction or tagging word that announces the change.

Figures 2, 3:
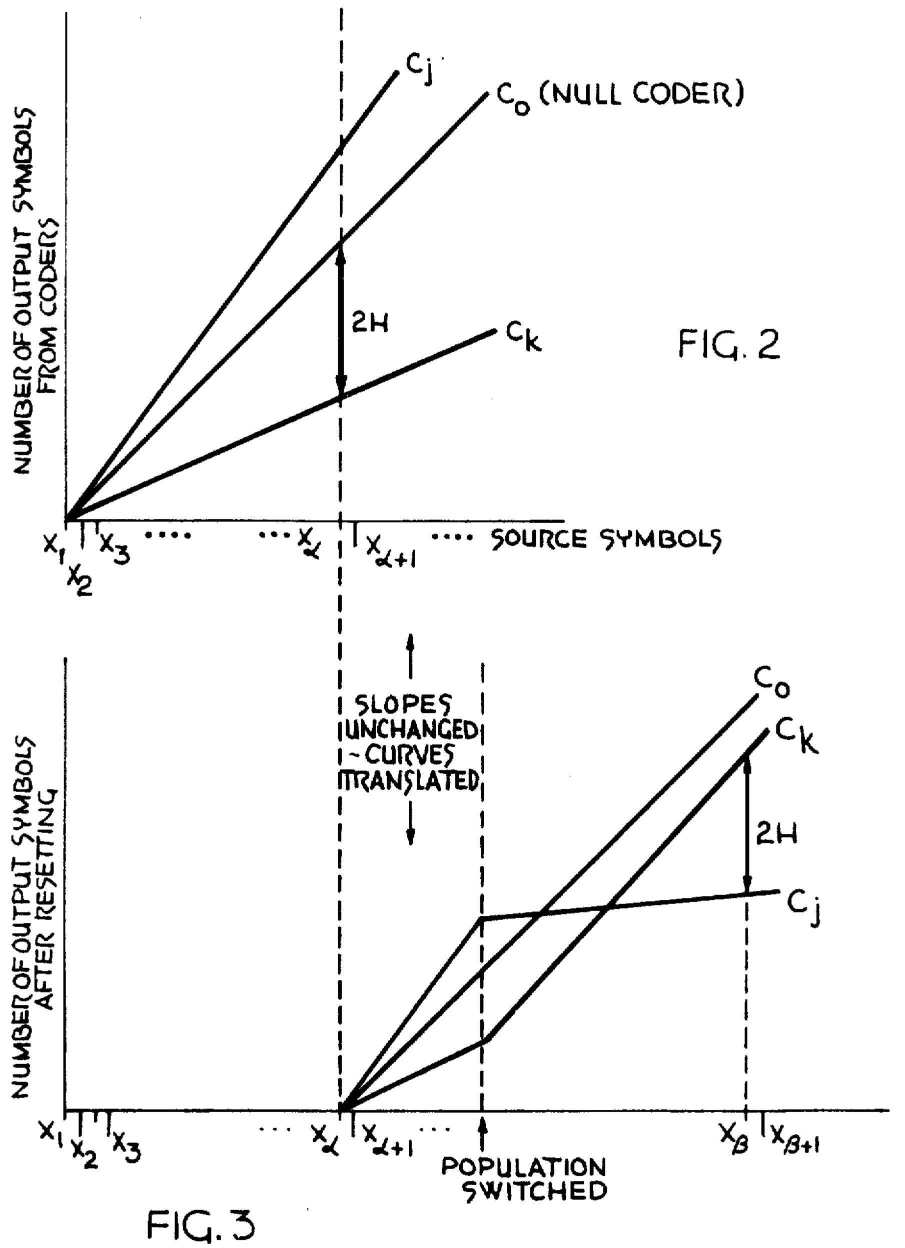
FIGS. 2 and 3 are similar graphs of modified performance.

Assume that the information source S is allowed to feed source symbols to the encoders, as in FIG. 1A, and that there are buffers, later described, inserted between the encoders and the transmitter output so that time is afforded before a decision is made as to which coder output is to be transmitted. As successive source symbols $x_1$, $x_2$ . . . etc., enter the coders, the number of symbols coming out of each coder is counted, presenting an output that, if plotted, is of the type shown in the graphs of FIG. 1B. If, for purposes of explanation, the graphs are temporarily thought of as smooth lines, as shown in FIG. 2, rather than as random walks or steps, then, as the source symbols $x_1$, $x_2$ . . . etc., enter the coders $C_0$, $C_1$ . . . etc., the graphs representive of output symbol counts will begin to diverge from each other. If compression is at all possible, one or more coder lines (for example, $C_k$ in FIG. 2) will be below the null-coder line $C_0$, so-labelled.

Assume that, as a convention, the receiver always presupposes that transmissions commence uncoded (i.e., using the output from $C_0$) unless the very first received word is a code-instruction or tagging word. The transmitter, before sending anything, first examines the outputs from the various coders as they enter the later-described buffers that precede the output register, with the following objective.

In the source sequence $x_1$, $x_2$ . . . etc., the smallest source-subscript $\alpha$ is sought such that $$C_k(x_\lambda, x_\alpha) < C_0(x_\lambda, x_\alpha) - 2H \qquad (1)$$

for some $k$, where H is the number of tagging symbols that must be transmitted to change codes, $\lambda$ (initially zero) is the number of source symbols that already have been transmitted, and $C_k(x_\lambda, x_\alpha)$ is the number of symbols that must be transmitted by coder $C_k$ to represent all source symbols starting with $x_{\lambda+1}$ and ending with $x_\alpha$. It costs H symbols to start transmitting in $C_k$ instead of $C_0$; but, if the first $\alpha$ source symbols are transmitted with the $C_k$ code, then a minimum of $2H-H=H$ symbols are saved. Even at $x_{\alpha+1}$ the line for $C_k$ veers up sharply and $C_k$ begins to cost more than $C_0$ per unit input symbol, therefore, the transmitter can switch back to $C_0$ (an operation that costs another H symbols) and still not have lost anything with respect to uncoded transmission.

Thus, the code-switching logic of the invention issues a command that initiates transmission of a code-instruction word identifying $C_k$, and of those symbols in the $C_k$ output buffer which correspond to the first $\alpha$ source symbols. While transmission is taking place, the code-switching logic allows enough new source symbols to enter the coders so that the logic can decide what code to use next before the transmitter has finished sending the symbols of the previous block. The object here is to keep the transmission line fully loaded at all times. This requirement defines the minimum computation rate for the switching logic, and it also defines the rate at which source symbols must be supplied to the coders.

To decide what code to use in the next step, it is noted that the cumulative number of symbols that the coders would have sent for the first $\alpha$ source symbols is now quite immaterial. What matters is how many symbols per source symbol they produce from $x_\alpha$ on. There is subtracted from each line of FIG. 2, therefore, its value at $x_\alpha$, resulting in the graph of FIG. 3.

Now the system is initially in the $C_k$ code, $\lambda$ has assumed its new value, and the system will stay with this code unless a new $\alpha$ is reached such that $$C_j(x_\lambda, x_\alpha) < C_k(x_\lambda, x_\alpha) - 2H, \text{ for some } j \qquad (2)$$

If this happens, the system transmits the symbols between $x_{\lambda+1}$ and $x_\alpha$ in code $C_j$. If this does not happen before the $C_k$ output buffer fills up, then transmission continues in code $C_k$. The $C_k$ buffer is emptied, all the other buffers are cleared, and the above procedure is repeated with all the coder output lines now originating from that source symbol which would have caused the $C_k$ buffer to overflow if the system had not just then stopped the search procedure.

The method of code selection outlined above is simple and effective, but it occasionally results in a transmission cost higher than what is incurred with uncoded transmission. A preferred method of code selection that never results in transmitting more symbols than are required for uncoded transmission might be tabulated as follows:

*Coder logic when discriminant equals 2H*

Let M represent the maximum capacity of coder buffers.

*Step 1.*—The value of $\lambda$ is initially zero as is the value of $i$ in Steps 2, 5 and 7. Proceed to Step 2.

*Step 2.*—Search for the smallest source sequence subscript $\alpha$ such that conditions (3) and (4) are both satisfied for some values of $k$:

$$\alpha - \lambda \leq M \qquad (3)$$

$$C_k(x_\lambda, x_\alpha) \leq C_i(x_\lambda, x_\alpha) - 2H \qquad (4)$$

If no such value of $\alpha$ is found, proceed to Step 7; otherwise proceed to Step 3.

*Step 3.*—Using the $\alpha$ value and $k$ value found in Step 2, determine whether or not condition (5) is satisfied:

$$C_k(x_\lambda, x_\alpha) \leq C_0(x_\lambda, x_\alpha) - H \qquad (5)$$

If condition (5) is satisfied, proceed to Step 4; otherwise proceed to Step 5.

*Step 4.*—Using the $\alpha$ value and $k$ value found in Step 2, transmit a code-instruction word, transmit the next $\alpha$ source symbols in code $C_k$, set the value of $i$ in Steps 2, 5 and 7 equal to the value of $k$ and proceed to Step 9.

*Step 5.*—Using the $\alpha$ value found in Step 2, determine whether or not condition (6) is satisfied:

$$C_i(x_\lambda, x_\alpha) \leq C_0(x_\lambda, x_\alpha) \qquad (6)$$

If condition (6) is satisfied, transmit the next $\alpha$ source symbols in code $C_i$ and proceed to Step 9; otherwise proceed to Step 6.

*Step 6.*—Transmit a code-instruction word for code $C_0$, transmit the next $\alpha$ source symbols in code $C_0$, set the value of $i$ in Steps 2, 5 and 7 equal to zero and proceed to Step 9.

*Step 7.*—Determine whether or not condition (7) is satisfied:

$$C_i(x_\lambda, x_{\lambda+M}) \leq C_0(x_\lambda, x_{\lambda+M}) \qquad (7)$$

If condition (7) is satisfied, transmit the next M source symbols in code $C_i$ and proceed to Step 9; otherwise proceed to Step 8.

*Step 8.*—Transmit a code-instruction word for code $C_0$, transmit the next M source symbols in code $C_0$, set the value of $i$ in Steps 2, 5 and 7 equal to zero and proceed to Step 9.

*Step 9.*—Set the value of $\lambda$ equal to the total number of source sequence symbols that have now been transmitted. Proceed to Step 2.

Using 2H, rather than H, as the discrimination level is ultra-conservative; its virtue being that it allows lossless return from any code to $C_0$ in case it turns out, in the interval following the decision interval, that the chosen code and all the other codes suddenly become more inefficient than uncoded transmission. Another way to obviate this danger is to monitor the interval following the decision interval before making a firm decision. When this is done, the discrimination level can be lowered from 2H to H without comprising the property that the system of the invention never transmits more inefficiently than uncoded.

The requisite steps for this operation may be tabulated as follows:

*Coder logic when discriminant equals H*

Let M represent the capacity of the coder buffers, and, as before, let $C_k(x_\lambda, x_\alpha)$ be the number of symbols that must be transmitted by the $k$th coder to represent all the source symbols starting with $x_{\lambda+1}$ and ending with $x_\alpha$. The object of the following logic is to identify that coder whose use results in the fewest transmitted symbols. Occasionally it will happen that two or more coders result in equally few transmitted symbols for a particular segment of source symbol sequence; the logic then selects a specific coder by applying some arbitrary rule to resolve the ambiguity, an example of such a rule being, "choose that coder whose subscript $k$ is least." Any number of other rules are admissible. In the coding logic presented here, occasional use is made of the term, "the preferred value, relative to $\lambda$ and $\alpha$, of a set of values of $k$," which term is defined by the following rule: from among the set of coder subscripts $k$ find the subset for which $C_k(x_\lambda, x_\alpha)$ is least; from among the subset of values $k$ thus found, find the least value of $k$.

*Step 1.*—The value of $\lambda$, the total number of source sequence symbols that have been transmitted, is initially zero. Proceed to Step 2.

*Step 2.*—Search for the smallest source sequence subscript $\alpha$ such that conditions (8) and (9) are both satisfied for one or more values of $h$:

$$\alpha - \lambda \leq M \qquad (8)$$

$$C_h(x_\lambda, x_\alpha) < C_0(x_\lambda, x_\alpha) - 2H \qquad (9)$$

If no such value of $\alpha$ is found, proceed to Step 3; otherwise proceed to Step 5.

*Step 3.*—Transmit M source symbols in $C_0$. Proceed to Step 4.

*Step 4.*—Set the value of $\lambda$ equal to the total number of source sequence symbols that have now been transmitted. Proceed to Step 2.

*Step 5.*—Using the value of $\alpha$ found in Step 2 and using the preferred value, relative to $\lambda$ and $\alpha$ of the set of values of $h$ found in Step 2, transmit a code-instruction word, transmit the next $\alpha$ source symbols in $C_h$, and set the value of $i$ in Steps 7, 8, 9, 12 and 13 equal to the preferred value of $h$. Proceed to Step 6.

*Step 6.*—Set the value of $\lambda$ equal to the total number of source symbols that now have been transmitted. Proceed to Step 7.

*Step 7.*—Search for the smallest source sequence subscript $\alpha$ such that conditions (10) and (11) are both satisfied for one or more values of $k$:

$$\alpha - \lambda \leq M \qquad (10)$$

$$C_k(x_\lambda, x_\alpha) < C_i(x_\lambda, x_\alpha) - H \qquad (11)$$

If no such value of $\alpha$ is found, proceed to Step 8; otherwise proceed to Step 9.

*Step 8.*—Determine whether or not condition (12) is satisfied:

$$C_i(x_\lambda, x_{\lambda+M}) \leq C_0(x_\lambda, x_{\lambda+M}) \qquad (12)$$

If condition (12) is satisfied, transmit the next M source symbols in $C_i$ and proceed to Step 6; otherwise transmit a code-instruction word for $C_0$ transmit the next M source symbols in $C_0$ and proceed to Step 4.

*Step 9.*—Using the value of $\alpha$ found in Step 7, search for the smallest source sequence subscript $\beta$ such that conditions (13) and (14) are both satisfied for one or more values of $k$:

$$\alpha - \lambda < \beta - \lambda \leq M \qquad (13)$$

$$C_k(x_\lambda, x_\beta) \leq C_i(x_\lambda, x_\beta) - 2H \qquad (14)$$

If no such value of $\beta$ is found, proceed to Step 11; otherwise proceed to Step 10.

*Step 10.*—Using the value of $\beta$ found in Step 9 and using the preferred value, relative to $\lambda$ and $\beta$, of the set of values of $k$ found in Step 9, determine whether or not condition (15) is satisfied:

$$C_k(x_\lambda, x_\beta) \leq C_0(x_\lambda, x_\beta) - H \qquad (15)$$

If condition (15) is satisfied, transmit a code-instruction word for $C_k$, transmit the next $\beta$ source symbols in $C_k$, set the value of $i$ in Steps 7, 8, 9, 12, and 13 equal to the preferred value of $k$ and proceed to Step 11.

*Step 11.*—Using the value of $\alpha$ found in Step 7 and using the preferred value, relative to $\lambda$ and $\alpha$, of the set of values of $k$ found in Step 7, search for the smallest source sequence subscrip $\delta$ such that conditions (16) and (17) are both satisfied for one or more values of $j$:

$$\alpha - \lambda < \delta - \lambda \leq M \qquad (16)$$

$$C_j(x_\alpha, x_\delta) < C_k(x_\alpha, x_\delta) - H \qquad (17)$$

If no such value of $\delta$ is found, proceed to Step 13; otherwise proceed to Step 12.

*Step 12.*—If the value of $i$ is among the values of $j$ found in Step 11, proceed to Step 13; otherwise proceed to Step 14.

*Step 13.*—Using the value of $\alpha$ found in Step 7, determine whether or not condition (18) is satisfied, $$C_i(x_\lambda, x_\alpha) \leq C_0(x_\lambda, x_\alpha) \qquad (18)$$

If condition (18) is satisfied, transmit the next $\alpha$ source symbols in code $C_i$ and proceed to Step 6; otherwise transmit a code-instruction word for $C_0$, transmit the next $\alpha$ source symbols in code $C_0$ and proceed to Step 4.

*Step 14.*—Using the value $\delta$ found in Step 11, the value of $\alpha$ found in Step 7 and the value of $k$ used in Step 11, and using the preferred value, relative to $\lambda$ and $\delta$, of the set of values of $j$ found in Step 11, determine whether or not condition (19) is satisfied:

$$C_j(x_\lambda, x_\alpha) - C_k(x_\lambda, x_\alpha) < H \quad (19)$$

If condition (19) is satisfied, proceed to Step 16; otherwise proceed to Step 15.

*Step 15.*—Using the value of $k$ and the value of $\alpha$ used in Step 11, determine whether or not condition (20) is satisfied:

$$C_k(x_\lambda, x_\alpha) \leq C_0(x_\lambda, x_\alpha) - H \quad (20)$$

If condition (20) is satisfied, transmit a code instruction word for $C_k$, transmit the next $\alpha$ source symbols in code $C_k$, set the value of $i$ in Steps 7, 8, 9, 12, and 13 equal to the value of $k$ and proceed to Step 6; otherwise transmit a code instruction word for $C_0$, transmit the next $\alpha$ source symbols in code $C_0$ and proceed to Step 4.

*Step 16.*—Using the value of $j$ and the value of $\alpha$ used in Step 14, determine whether or not condition (21) is satisfied:

$$C_j(x_\lambda, x_\alpha) \leq C_0(x_\lambda, x_\alpha) - H \quad (21)$$

If condition (21) is satisfied, transmit a code instruction word for $C_j$, transmit the next $\alpha$ source symbols in code $C_j$, set the value of $i$ in Steps 7, 8, 9, 12, and 13 equal to the value of $j$, and proceed to Step 6; otherwise transmit a code instruction word for $C_0$, transmit for the next $\alpha$ source symbols in code $C_0$ and proceed to Step 4.

The reason for including conditions of the form exemplified by (8), (10) and (13) is that the code-selection decision cannot be delayed indefinitely because the buffers at the outputs of the coders must, in practice, be constructed out of physical elements and will thus have a finite and definite maximum capacity. The efficiency of the decisions which are forced by imminent buffer overflow can be increased by reading out of the buffers (into the transmitter output register) groups of symbols smaller than the full block of M symbols, but the improved efficiency is gained at the expense of great equipment complexity.

The coding systems described in the sequel are more complicated than the logic described above because coders often produce outputs intermittently, in blocks of symbols, rather than giving an output for each input symbol (run-length coders, for example, behave in this manner) and different coders may give their outputs at different times. Since the time at which a code is chosen will not usually coincide with the last output time of the chosen code, the beginning of the next decision interval must be moved back to where that coder gave its last output. Thus, to re-start the system, there must be available some source symbols that occurred in the past, which implies the use of an input buffer, as later explained.

The appropriate logic is hereinafter presented with reference to the block diagram of FIG. 4. For purposes of simplified illustration, the system of FIG. 4 is based on a 2H discrimination level, though it is possible to base the same on H and other arrangements of greater complexity and to base the same upon clearing output buffers by individual symbols rather than by blocks of symbols, as well.

Figure 4:
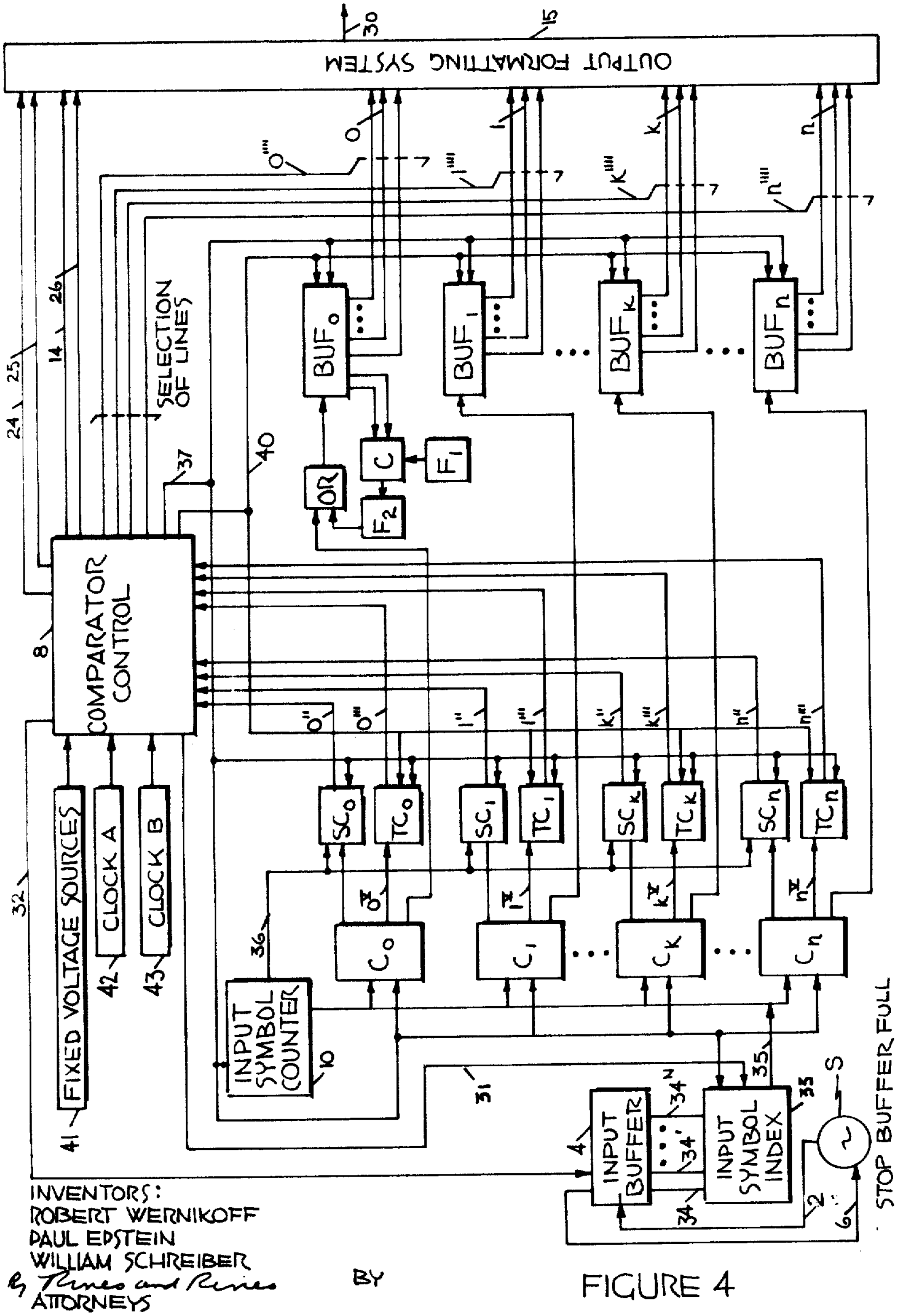
FIG. 4 is a block diagram of a preferred generic encoding and transmitting system embodying the invention.

Since the individual components used in FIG. 4 are so well known and conventional in computer and coding systems, specific forms of coders, counters, buffers, comparators, code generators and shift registers and the like are not illustrated; it being readily obvious to those skilled in this art that the method underlying the invention may be practiced with many forms of such building blocks and that a principal feature of novelty resides in the concept of the method steps involved.

Referring to FIG. 4, the source of message symbols S is shown applying the same by conductor 2 to the beforementioned input buffer 4, of any conventional type, that, when filled, transmits a stop signal to the source S via path 6, as is well known. Suitable apparatus for this purpose in, for example, the case of a binary source S, may be the Digital Equipment Corporation Type 4223 buffer registers connected with the Type 4215 counters for generation of stop signals, as described, for example, on pages 6.17 through 6.21 of System Modules (C–100), published in 1964 by the said Digital Equipment Corporation of Maynard, Mass. Clearly, other types of well-known buffer apparatus may also be used.

The input symbol index 33 controls the passage of source sequence symbols from the input buffer 4 via conductors 34, 34' . . . $34^N$ corresponding to each symbol stored in the buffer 4, to the coders $C_0$, $C_1 \ldots C_k \ldots C_n$ via conductor 35. Suitable apparatus for this purpose in, for example, the case of a binary source S, may be the Digital Equipment Corporation Type 4111 gates for symbol selection as described, for example, on page 6.2 of the said System Modules text and the Type 4215 counters for designation of the symbol to be selected as described, for example, on pages 6.17 through 6.21 of the said Systems Modules text. The total number of input symbols from the input symbol index, moreover, is counted in the counter 10.

The input symbol index 33 accepting the message symbols from input buffer 4 simultaneously feeds the different encoders $C_0$ (the null coder) $C_1 \ldots C_k \ldots C_n$ as in the embodiment of FIG. 1A, with the respective outputs thereof applied, as previously suggested, to output buffers $BUF_0$, $BUF_1 \ldots BUF_k \ldots BUF_n$ such as of the type described in connection with input buffer 4. The encoders may each be of any desired conventional type, being a device that accepts a sequence of symbols and produces another sequence at its output in accordance with some fixed rule. The simplest kind of coder is one that performs translation from one alphabet to another. An example is a teletypewriter to which a stream of English letters is fed (by depressing the corresponding keys in sequence) and from which a sequence of off/on pulses issue, with specific combinations of seven pulses representing each input symbol. The coders of principal interest in connection with the present invention are those in which the translation rule that governs them profits from known peculiarities of the input sequence to reduce the time-bandwidth product required for transmission of the output sequence. Many examples are extant, of which two of the earliest are given by Vernam et al. (U.S. Patent No. 1,851,072) and by Watson (U.S. Patent No. 2,115,894). The translation rule, or code, described in the references is called run-length coding. It is suitable for binary sequences such as might be obtained by facsimile scanning of black-and-white copy, in which one symbol (say that representing white) occurs much more frequently than the other (representing black). In such cases, transmission time can be economized by transmitting, not a long sequence of white-representative symbols, but merely the number of such symbols that occur in an uninterrupted sequence, or run. The corresponding embodiment is nothing more than a counter.

Another well-known code is the so-called Shannon-Fano Code, described, for example, by C. E. Shannon in The Mathematical Theory of Communication, University of Illinois Press, Urbana, 1949, page 29. A possible coder embodying this code is described in U.S. Patent No. 2,909,601 to Fleckenstein et al. Many other codes and embodiments thereof are described by B. M. Oliver, Efficient Coding, Bell System Technical Journal, July 1952, pages 724–750; and in Schreiber and Inouye, U.S. Patent No. 2,963,551.

The encoders also provide event markers (indications showing that the respective code words have been produced) at the times that the respective code words are produced, and the respective event markers are applied to input marking registers $SC_0$, $SC_1 \ldots SC_k \ldots SC_n$ so that the counts of input symbols in counter 10 at the times of the event markers may be received via conductor 36 and stored in the respective input marking registers. The input marking registers may be of any desired conventional type such as, for example, the said Digital Equipment Corporation Type 4219 jam buffer register described on pages 6.24 and 6.25 of the said Systems Modules text. The encoders further provide outputs $0^v, 1^v \ldots k^v \ldots n^v$ which indicate the number of symbols in the code words produced by the respective encoders and which are applied respectively to output marking counters $TC_0, TC_1 \ldots TC_k \ldots TC_n$ so that the total number of symbols in the code words produced by the respective encoders since the beginning of the current decision interval may be counted by said output marking counters. Said output marking counters are, moreover, adapted to receive signals applied by conductor 40 which increment said output marking counters. Said output marking counters may be of any desired conventional type such as, for example, the said Digital Equipment Corporation Type 4215 complementing flip-flops described on page 6.17 of the said Systems Modules text. A fixed voltage source 41 applies a multiplicity of voltages respectively indicative of the number of symbols which may be stored in the output buffers $BUF_0, BUF_1 \ldots BUF_k \ldots BUF_n$ to comparator control 8, of any desired conventional type such as, for example, a multiplicity of the said Digital Equipment Corporation Type 4215 counting and storing circuits and comparator gates Type 4141, described on page 6.5 of the said System Module text. The input marking registers $SC_0, SC_1 \ldots SC_k \ldots SC_n$ are provided with respective connections $0'', 1'' \ldots k'' \ldots n''$ to another input of comparator control 8 to apply respective counts of input symbols to comparator 8. The output marking counters $TC_0, TC_1 \ldots TC_k \ldots TC_n$ are provided with respective connections $0''', 1''' \ldots k''' \ldots n'''$ to still another input of comparator control 8 to apply respective counts of output symbols to comparator control 8.

A clock 42 of any desired conventional type, such as, for example, the said Digital Equipment Corporation Type 4401 variable clock described on page 6.36 of said Systems Modules text, applies high frequency timing pulses to comparator control 8 and another clock 43 applies low frequency timing pulses to comparator control 8 at a rate suitable for transmission of output symbols.

Each output buffer $BUF_0 \ldots BUF_1 \ldots BUF_k \ldots BUF_n$ is also connected respectively at 0, 1 . . . $k$ . . . $n$ to the output formatting system 15 later described. Selection of the appropriate buffer is effected by the respective output conductors $0'''', 1'''' \ldots k'''' \ldots n''''$ from the comparator 8. The schematic showing of the last-named conductors is intended to represent conventional gating selection connections, such as, for example, are described on page 6.8 of the said Systems Modules text. The output formatting system 15 is adapted to receive from comparator 8 a strobe signal via conductor 14, an output position selecting signal via conductor 24, a designation of selected code signal via conductor 26, and shift command pulse via conductor 25. Symbols are removed from the output formatting system 15 via conductor 30 for transmission by any desired communication technique.

Figure 4A:
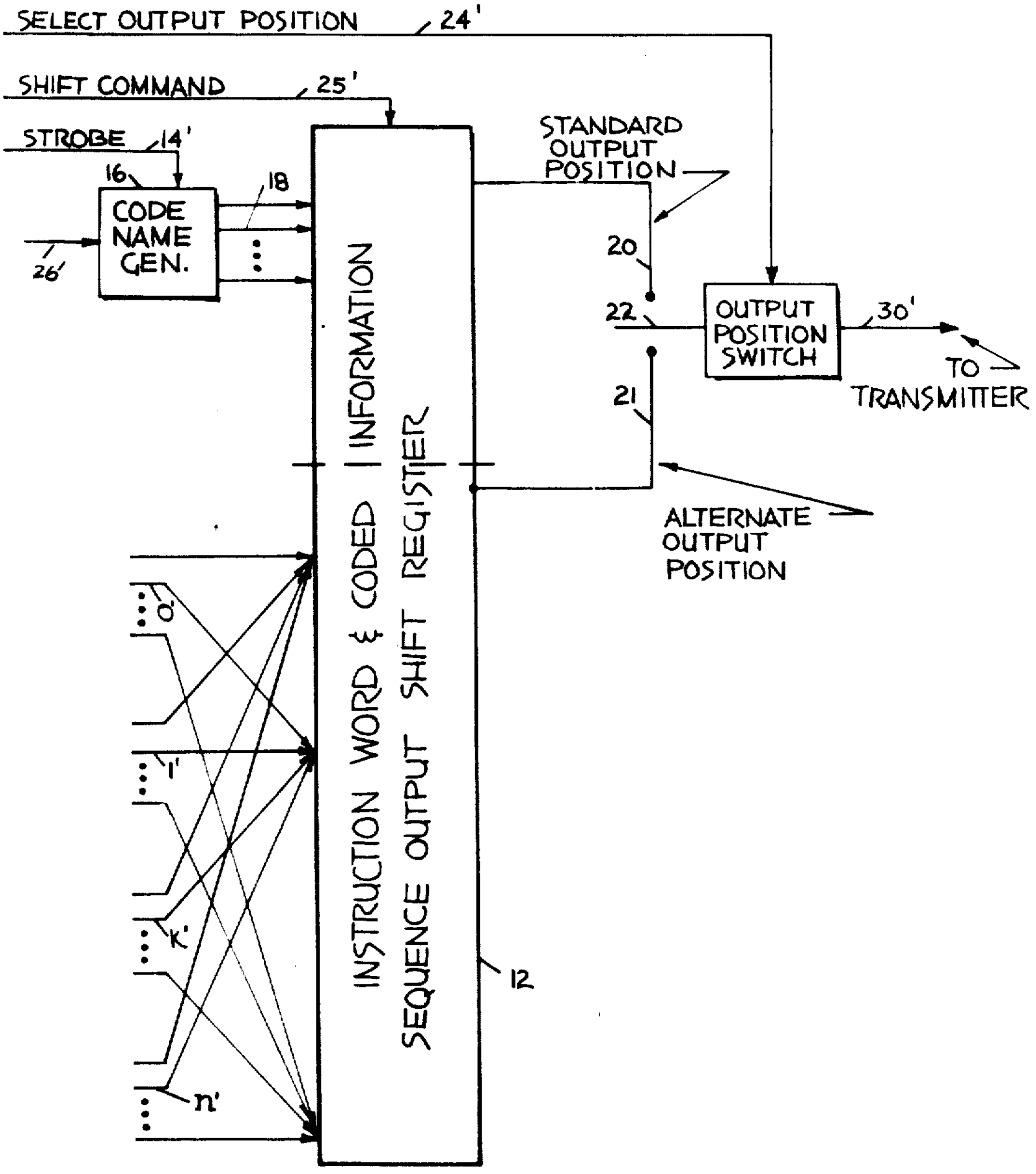
FIG. 4A is a block diagram of the output formatting system of FIG. 4.

Referring to FIGURE 4A, a block diagram of the output formatting system 15 of FIGURE 4 is illustrated. Conductors 0', 1' . . . $k'$ . . . $n'$ are shown respectively applying the gated outputs 0, 1 . . . $k$ . . . $n$ of output buffers $BUF_0, BUF_1 \ldots BUF_k \ldots BUF_n$ of FIG. 4 to an output shift register 12, of any well-known type which may, for example, embody Digital Equipment Corporation Type 4221 shift registers, described on page 6.21 of the said System Modules text. A code-name generator 16 generates the instructional or tagging word for the selected code, in accordance with the designation of selected code signal conveyed to said code-name generator via conductors 26 and 26'. The code-name generator may assume the form, for example, of a plurality of fixed voltages applied to the Digital Equipment Corporation Type 4127 gates described on page 6.8 of the said Systems Modules text, or other conventional circuits. The strobe signal on conductors 14 and 14' causes the instructional or tagging word to be applied to output shift register 12 via conductors 18, as is well-known.

The output of the shift register 12 may be fed either by way of a standard output 20 or an alternate output 21 connected to corresponding position contacts of an output position switch 22 the orientation of which is controlled by an output position selecting signal applied by conductors 24 and 24'. A conventional shift command pulse is applied by conductors 25 and 25' to control the shift register 12, as is well-known.

It is now in order to explain the operation of the system of FIG. 4 and the production of the previously described novel results of the invention obtained thereby. Let $x_{a_k}$ for $k=0, 1 \ldots n$ represent the input symbol last encoded by encoder $C_k$ to produce the last code word produced by encoder $C_k$. Let $A_k$ represent the capacity of output buffer $BUF_k$ for $k=0, 1 \ldots n$ and let $B_k$ be the greatest number of symbols which may be stored in output buffer $BUF_k$ for $k=0, 1 \ldots n$ such that subsequent addition of the longest word which can be produced by encoder $C_k$ to those words already stored in output buffer $BUF_k$ will not cause that buffer to overflow. Let the subscript $i$ denote the code selected during the decision interval preceding the current decision interval; in the initial decision interval, $i$ is to be regarded as equal to zero.

Input symbols $x_{\lambda+1}, x_{\lambda+2} \ldots$ etc., where $\lambda$ is the value before discussed, stored in the input buffer 4 are selected by the input symbol index 33 and are permitted to pass to the encoders $C_0, C_1 \ldots C_k \ldots C_n$. As each encoder, for example $C_k$, produces a code word, that code word is sent to corresponding output buffer $BUF_k$ sufficiently rapidly that no new input symbol meanwhile is applied to encoder $C_k$, the count in corresponding output marking counter $TC_k$ is increased with like rapidity by an amount equal to the number of symbols in the code word produced by encoder $C_k$, and an indication is sent to corresponding input marking register $SC_k$ so that the number stored in input symbol counter 10 at the time at which the $C_k$ output occurred may also be stored in input marking register $SC_k$. The count stored at any given time in the input marking register $SC_k$ is given by the expression $$SC_k(x_\lambda, x_{a_k}) = \alpha_k - \lambda \qquad (22)$$

for $k=0, 1 \ldots n$. The count store at any given time prior to code selection in the output marking counter $TC_k$ for $k=0, 1 \ldots n$ is equal to $C_k(x_\lambda, x_{a_k})$, the number of symbols produced by encoder $C_k$ to represent all source symbols starting with $x_{\lambda+1}$ and ending with $x_{a_k}$.

Using the outputs of the fixed voltage source, the input marking registers and the output marking counters, comparator 8 determines whether or not the expressions $$C_k(x_\lambda, x_{a_k}) > 0 \qquad (23)$$

$$C_i(x_\lambda, x_{a_i}) > 0 \qquad (24)$$

$$C_0(x_\lambda, x_{a_0}) \leq B_0 \qquad (25)$$

$$C_k(x_\lambda, x_{a_k}) \leq A_k \text{ for } k \neq 0 \qquad (26)$$

$$C_i(x_\lambda, x_{a_i}) \leq B_i \qquad (27)$$

$$C_k(x_\lambda, x_{a_k}) \leq C_i(x_\lambda, x_{a_i}) - 2H \qquad (28)$$

$$SC_k(x_\lambda, x_{a_k}) \geq SC_i(x_\lambda, x_{a_i}) \qquad (29)$$

$$C_k(x_\lambda, x_{a_k}) \leq C_0(x_\lambda, x_{a_0}) - H \qquad (30)$$

are satisfied, where H is the value before discussed. If expressions (25) and (27) are both satisfied, operation continues until expression (24) is satisfied and expressions (23), (26), (28), (29) and (30) are all satisfied for one or more values of $k$. If there is more than one such $k$ value, the ambiguity is resolved by means of some specific but arbitrary rule (for example, "choose the least value of $k$ from among such $k$ values") and operation continues as described below for transmission of $\alpha_k-\lambda$ source symbols $x_{\lambda+1}, x_{\lambda+2} \ldots x_{\alpha_k}$ in code $C_k$, with code-instruction word preceding.

If expression (25) or expression (27) fail to be satisfied before a value of $k$ can be found as above described, comparator 8 determines whether or not the expression $$C_1(x_\lambda, x_{\alpha_1}) \leq SC_1(x_\lambda, x_{\alpha_1}) \qquad (31)$$

is satisfied. If the expression (31) is satisfied, operation continues as described below for transmission of $\alpha_1-\lambda$ source symbols $x_{\lambda+1}, x_{\lambda+2} \ldots x_{\alpha_1}$ in code $C_1$ with no code-instruction word preceding; otherwise operation continues as described below for transmission of $\alpha_1-\lambda$ source symbols $x_{\lambda+1}, x_{\lambda+2} \ldots x_{\alpha_1}$ in code $C_0$ with code-instruction word preceding.

When a code has been selected by comparator control 8 the flow of input symbols from input symbol index 33 is halted by a signal applied via conductor 31 and a signal is applied via conductor 32 to input buffer 4 so that it commences re-filling and shifting out all source symbols which have been encoded by the encoder corresponding to the selected code. The number of source symbols to be thus shifted is determined by the count in the input marking register corresponding to the selected code. The count of the output marking counter corresponding to the selected code is noted by storage in comparator control 8, whereupon a sequence of shift commands is sent by said comparator control via conductor 40 to simultaneously cause the output buffers $BUF_0$, $BUF_1 \ldots BUF_k \ldots BUF_n$ to shift and the output marking counters $TC_0$, $TC_1 \ldots TC_k \ldots TC_n$ to increment, and the commands are continued until the count in the output marking counter and the output buffer capacity A corresponding to the selected code are equal, as determined by the comparator control 8. Thus when the said shift commands cease, the first output symbol produced by the selected encoder during the current decision interval appears at the end of the corresponding output buffer. An indication of the code selected by comparator 8 is sent to output formatting system 15 via conductor 26, and another indication is sent via that one of conductors 0'''', 1'''' . . . $k''''$ . . . $n''''$ corresponding to the code selected by comparator 8 to enable the output before corresponding to the selected code to apply its contents to output formatting system 15 via the appropriate one of conductors 0, 1 . . . $k$ . . . $n$.

Referring to FIG. 4A, the shift register 12 receives the contents of the selected output buffer. For transmission of output symbols with no code-instruction word preceding, a signal is applied via conductor 24' to set output position switch 22 to alternate output position 21. The count previously noted in comparator control 8 of the output marking counter in FIG. 4 corresponding to the selected code is used by the said comparator control in FIG. 4 to determine the number of shift commands that are applied via conductor 25' to remove output symbols from shift register 12 and to apply said output symbols via conductor 30' to the transmitter.

For transmission of output symbols with code-instruction word preceding, a signal is applied via conductor 24' to set output position switch 22 to standard output position 20. A strobe signal is applied via conductor 14' to code name generator 16 so that it applies the code-instruction word corresponding to the selected code to shift register 12 via conductors 18. Shift commands are applied via conductor 25' to shift register 12 to remove the code-instruction word and output symbols from shift register 12 and to apply same to the transmitter via conductor 30'.

Referring to FIG. 4, the input symbol index and all coders, input marking registers, output marking counters and output buffers are cleared or reset by a signal applied via conductor 37. From this time on, all coders are again started with this point as the new effective origin as discussed in connection with the graph of FIG. 3.

The set of possible codes of encoders $C_1 \ldots C_k \ldots C_n$, moreover, is designed such that the set of their output words for any possible input never contains, either as a word or as a prefix of a word, the uniquely-decipherable word that is used as a code-switch instruction word at 16. This can be done by design in all coders save the null coder $C_0$. For $C_0$, as is shown in FIG. 4, an "or" gate, labelled OR, may be connected in the output line to output buffer $BUF_0$ ordinarily to pass the output of null coder $C_0$ to buffer $BUF_0$. If the uniquely-decipherable word is stored as a sequence of fixed voltages at $F_1$, then the detection of the uniquely-decipherable word at the output buffer $BUF_0$ will cause the comparator circuit C, also fed by the circuit $F_1$, to activate a symbol generator $F_2$ to apply a supplemental set of symbols, denoting the code name for the null encoder $C_0$, sufficiently rapidly that no other symbol meanwhile emerges from encoder $C_0$, through the OR gate to the buffer $BUF_0$. The receiver, in the $C_0$ position, receiving the uniquely-decipherable word followed by the code name for encoder $C_0$ will thus not regard the said word as a tagging word. It will remain in the $C_0$ mode while utilizing the uniquely-decipherable word as the information sequence that it properly represents. In view of the low probability of occurrence of the above, the occasional supplemental introduction of the $C_0$ code name does not materially affect the efficiency of the system.

It will be readily apparent to those skilled in the art that the coding system of FIGS. 4 and 4A can, at the cost of some added complexity, be made more efficient as would be the case, for example, if the discrimination level in the code selection logic were changed from 2H to H, as before described, and in other ways; and that the apparatus of FIGS. 4 and 4A can be simplified without affecting the method of production of the novel results of this invention as, for example, in the case when the source sequence and the encoded sequence are composed of symbols drawn from a common alphabet, in which case the output sequence from the null encoder $C_0$ is identical with the input sequence and the output buffer $BUF_0$ as well as the input marking register $SC_0$ and the output marking counter $TC_0$ (whose count always equals the number stored in $SC_0$) all become unnecessary, since their contents are available respectively in the input buffer and in the input symbol counter. It will also be apparent that a reduction in equipment complexity can, in some cases, be obtained at little cost in coding efficiency, by making the code selection decision on the basis of a fixed number of input symbols rather than basing it on a variable number, as is the effect of the decision rules previously described in connection with FIG. 4. One useful set of code selection rules based on a fixed number of input symbols is described, for example, in connection with the apparatus of FIGS. 5, 5A and 5B; and many other variations of the method and apparatus of FIG. 4 are possible.

Figure 4B:
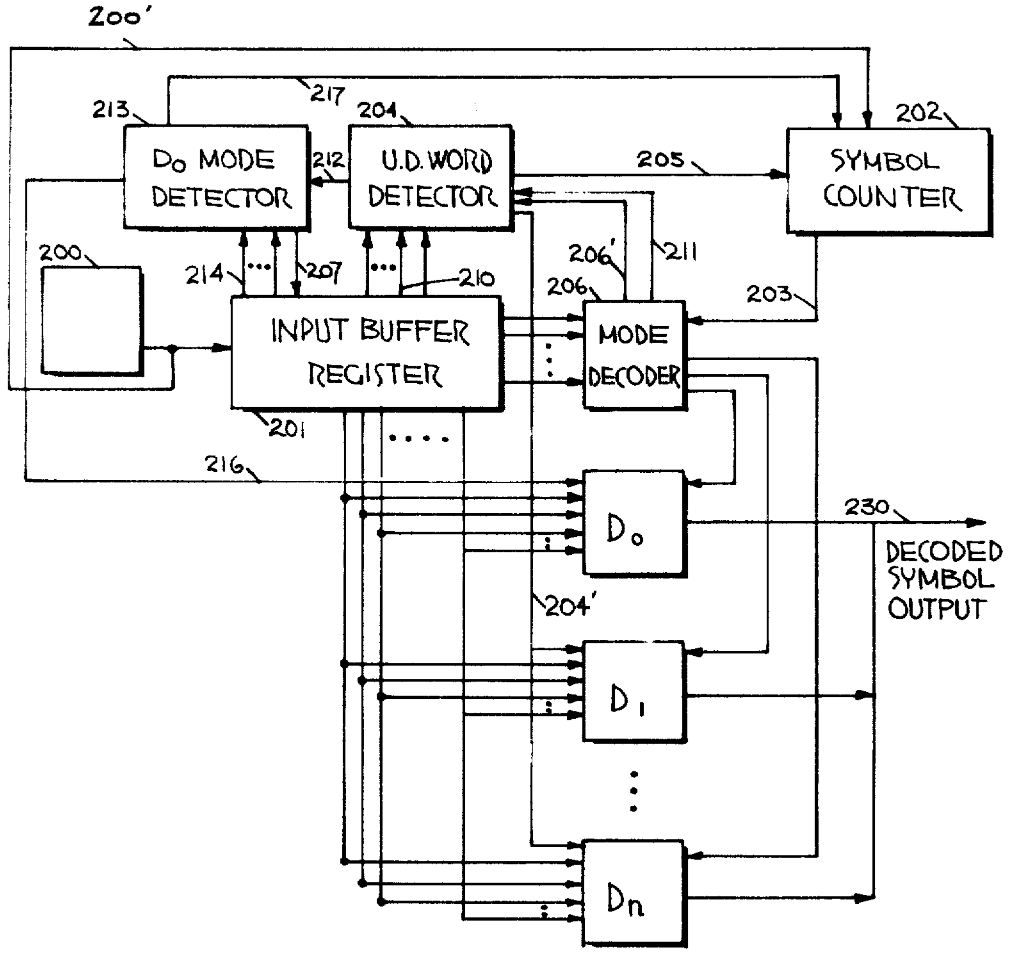
FIG. 4B is a similar diagram of a preferred generic decoding or receiving system for use with the transmitting system of FIG. 4, FIGS. 4, 4A and 4B, as a unit, together constituting a complete system employing the invention.

The signals transmitted at 30 with any desired communication technique are received at 200 in FIG. 4B, there thus being provided at the receiving system the transmitted code-symbols containing the uniquely-decipherable code-switching word followed by the code name. The latter allows the receiver to switch the incoming sequence to that decoder which is appropriate to undo the transmitter coding. The terms "communication" and "transmitting" as herein employed are intended, moreover, to embrace not only such operations as propagation along lines, radio, sound, light or other links, but also passage to storage, such as magnetic, optical or other memory systems, or other utilization apparatus. In the event of transmission to storage, it is the storage capacity rather than the time-bandwidth product of transmission, of course, that is economized.

The decoding logic treats the symbols received from the encoder system of FIG. 4 in such a fashion as to reconstruct the original symbol sequence which was encoded. This is accomplished by having logical operations determine the means of coding used by the transmitter and the times at which the transmitter has changed its method of transmission. With this information, the proper decoder is selected to reconstruct the original source sequence.

With specific reference to the embodiment of FIG. 4B, the symbols received at 200 are stored in an input buffer register 201 and they are also fed at 200' to be counted by a symbol counter 202 to generate a completion pulse at output 203 when a specified number of symbols has been received. A detector for monitoring the reception of the uniquely-decipherable word representing a code-switching instruction is provided at 204, labelled "U.D. Word Detector," and is connected at 210 to the outputs of the input buffer register 201.

Assume that the machine is operating in some arbitrary mode. When the uniquely-decipherable word detector 204 detects the uniquely-decipherable code-switch instruction word, a pulse is transmitted along conductor 204' to decoders $D_1 \ldots D_n$ to notify each decoder that the uniquely-decipherable word has been detected and that this word is not to be considered by these decoders as being a part of a legitimate message sequence; hence $D_1 \ldots D_n$ will use only the symbols currently stored in them to do the decoding. If the mode decoder 206 notifies the U.D. Word Detector 204 via conductor 206' that the current mode is the $C_0$ mode, a $D_0$ mode detector 213 is activated via conductor 212 upon notice of detection of the uniquely-decipherable word. If the $D_0$ mode detector 213 determines, from its input along conductors 214, that the symbols in the input buffer register 201 following the uniquely-decipherable word are not the symbols denoting the $C_0$ mode, a pulse is emitted to the $D_0$ decoder via conductor 216 to notify the $D_0$ decoder to discontinue taking symbols from the input buffer register 201, as is done for the decoders $D_1 \ldots D_n$ above described. If, on the other hand, the $D_0$ mode detector finds that the symbols do denote the $C_0$ mode, no pulse is emitted on 216 and the $D_0$ decoder uses the symbols denoting the uniquely-decipherable word as proper symbols for decoding; simultaneously, the extra symbols representing the $C_0$ mode are removed via conductor 207, thus keeping the $D_0$ decoder working on the proper steady stream of symbols. If the pulse is emitted via conductor 216, a pulse is also transmitted via conductor 217 to notify the symbol counter 202 that the uniquely-decipherable word has been detected and that the counter 202 should proceed to count the symbols constituting the uniquely-decipherable word. When the previous mode was not $C_0$, the uniquely-decipherable word detector 204 transmits a pulse via conductor 205 similarly to notify the counter 202. At the end of this count, mode decoder 206 is notified by way of conductor 203, to admit the following symbols denoting the code name representative of the encoder selected at the transmitter. Depending upon the resulting storage in mode decoder 206, the appropriate decoder and buffer circuit $D_0, D_1 \ldots D_n$ (corresponding to respective encoders $C_0, C_1 \ldots C_n$ at the transmitter) will be selected as shortly described, to connect the output of the proper decoder to the decoded symbol output line 230 and thus permit the proper decoding of the symbols received in the input buffer register 201.

Using the decoded information concerning which mode is operative, upon the completion of the said word count in the counter 202, the mode decoder 206 will activate the appropriate decoder-buffer $D_0, D_1 \ldots D_n$ to cause the thusly selected decoder-buffer to store input symbols and to produce a stream of output symbols which constitute the decoded message. Such buffer-decoder operates autonomously after being selected and connected to the input buffer.

The receiver always begins operation as if the initial transmission were to be in the $C_0$ code; that is, the mode-decoder 206 is initially in the state corresponding to decoding by decoder-buffer $D_0$, and the said mode-decoder will persist in that state until a uniquely-decipherable code-switching instruction word followed by code name symbols other than those corresponding to $C_0$ are received.

The detectors of the unit 204 may, for example, be of the comparator type described in connection with elements 8 and C in FIG. 4; the input buffer register 211 may be of the type employed in the output buffers $BUF_0$, $BUF_1 \ldots$ etc., of FIG. 4; the mode decoder 206 may assume the form described on pages 2.15 through 2.17 of the said System Modules text; and the decoders $D_0, D_1 \ldots$ etc., may be of the type described in the patents and publications previously mentioned in connection with the encoders of FIG. 4. Clearly, other types of well-known circuits and apparatus may also similarly be used.

One of the important features of the method underlying the present invention involves the explicit determination of the transmission cost incurred in sending the current portion of the source sequence by each of a variety of codes, and at each instant, the choosing of the most efficient code. Just how the transmission cost is determined is immaterial, so long as the determination is based on actual performance. The method of determining cost presented above envisages the actual construction and operation of a set of coders, and the counting of output symbols therefrom. It would be equally valid to have a special computer which accepts the input sequence and determines the count of output symbols, or other measure of actual performance, by simulating the various coders, or by making use of known algebraic relations between input sequences and output symbol counts, or other measure of performance, to determine the latter. Under certain conditions, as in the example that follows, the second approach requires less equipment. This computed evaluation and simulation of the various encoders, however, serves as and is fully equivalent to the actual use of a separate plurality or set of encoders and is so treated in this specification and is so intended in the language used in the claims relating to the pluralities of codes, encoders and decoders.

For some types of communication, a single kind of code can, merely through changes in certain characteristic parameter values, be made to fit all the populations that a given source can produce. An example is black-and-white facsimile transmission, for whose populations run-length coding is indicated. A particularly practical form of run-length coding, because it requires a minimum of equipment, is that which results in words of fixed length; i.e., at each transition from black to white, or vice versa, the transmitter sends a word representative of the number of steps it traversed in going from the previous transition to the present one. Since all words have the same number of symbols, the receiver can unambiguously break up the continuous stream of incoming symbols into discrete words. Because, however, each word has a fixed finite length, it cannot describe an arbitrarily large distance between transitions in the input copy. If, indeed, a word consists of N symbols chosen from an alphabet of A members, the word can describe any distance between 1 and $A^N$, but no more. A six-symbol binary word, for example, can describe all distances between 1 and $2^6$. Since transitions will sometimes be farther apart than this maximal run, a word must also be transmitted at the end of each maximal run to re-start the count. Sending these words is inefficient, and it is desirable that there be as few as possible. This can be done by choosing fixed-length words containing many symbols, so that they can accommodate very long maximal runs. But then each legitimate transition also costs many symbols, and if there are many transitions, this grows inefficient (while at the same time the probability of very long runs grows smaller).

The length of the fixed-length word, therefore, should be chosen greater or smaller, depending on the current density of transitions in the input sequence. If the apparatus is set up to transmit fixed-length words of, say, eight different lengths, and if a particular sequence is in the input buffer, it is easy to count how many transitions occur in the sequence and also how many transitionless maximal runs occur for each of the chosen lengths of fixed-length word. Given the input sequence, it is just as easy to compute how many output symbols each of the possible codes will produce as it is to construct the actual encoders and count their outputs. For this case, it is less expensive, in terms of equipment, to compute.

When one scans documents for facsimile transmission, for example, some lines contain many transitions from black to white, others contain few, and still others have transitions very rarely or never. In this case, instead of having several (perhaps eight) different encoders $C_0$, $C_1$ . . . etc., each of which is a run-length coder, it clearly is more economical to take the source sequence (the scanner lines arranged end-to-end in time), count the transitions and the number of maximal runs (and store the sequence itself), then use this count in an algorithm which, by calculation rather than by simulation, determines the best code to use at any given time. Since the only free variable or parameter is the length of the best fixed-length word, the computer determines this number by implementing the code-switching logic described earlier, and then, having determined the best parameter values, the computer adjusts a single run-length encoder accordingly. The encoder, which is now optimized for the source sequence in storage, or the initial portion thereof, is now fed the source sequence until the computer decides that it is time to switch the run-length code parameter to a new value. Every time the code parameter is changed, an instruction word is sent to the receiver telling it the new value of the code parameter.

Figure 5:
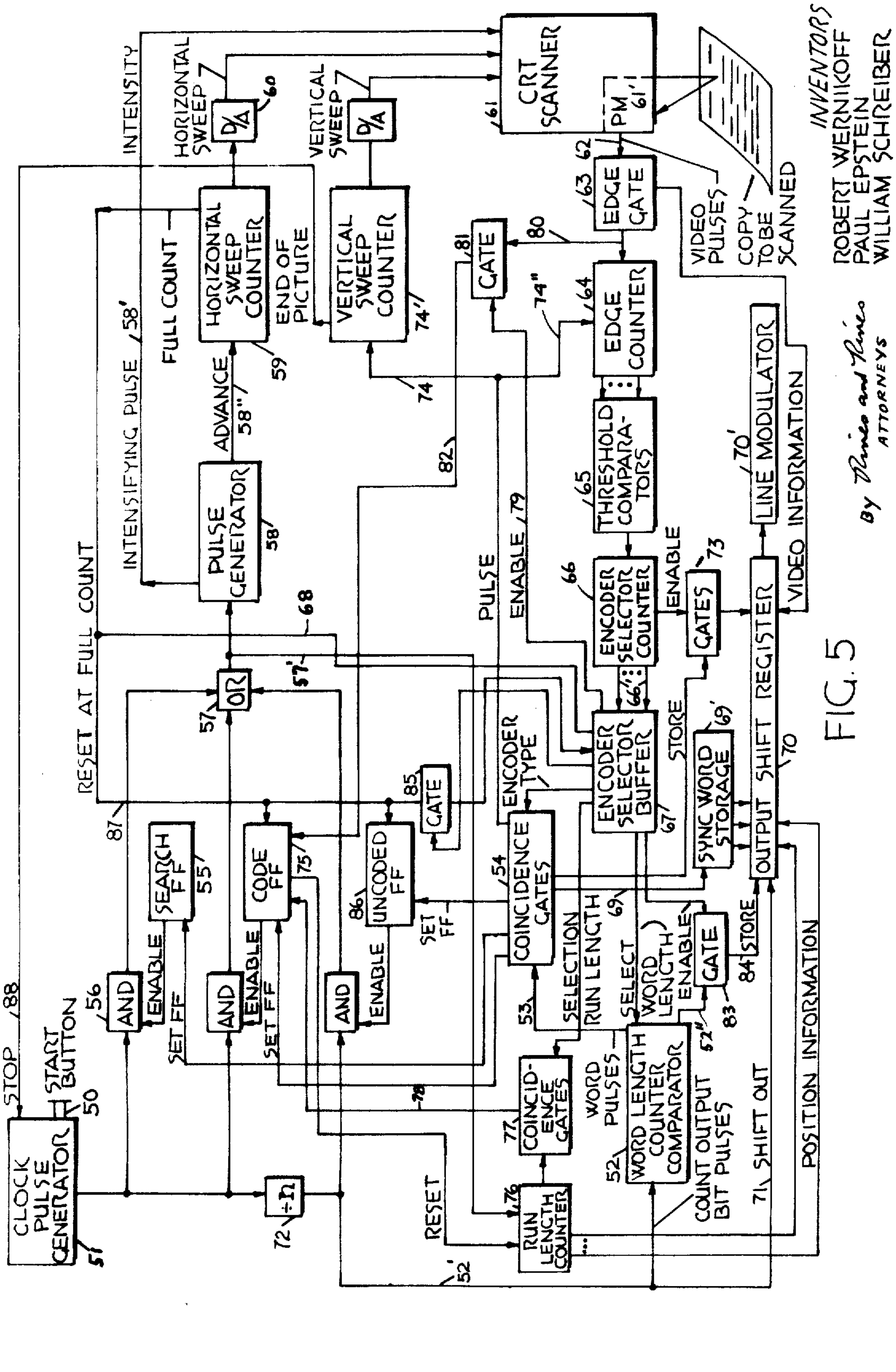
FIGS. 5 and 5A are block diagrams of the transmitting and receiving sections, respectively, of a preferred facsimile or similar scanning system using the novel techniques of the invention as a species of the generic concept of FIGS. 4, 4A and 4B.
Figure 5A:
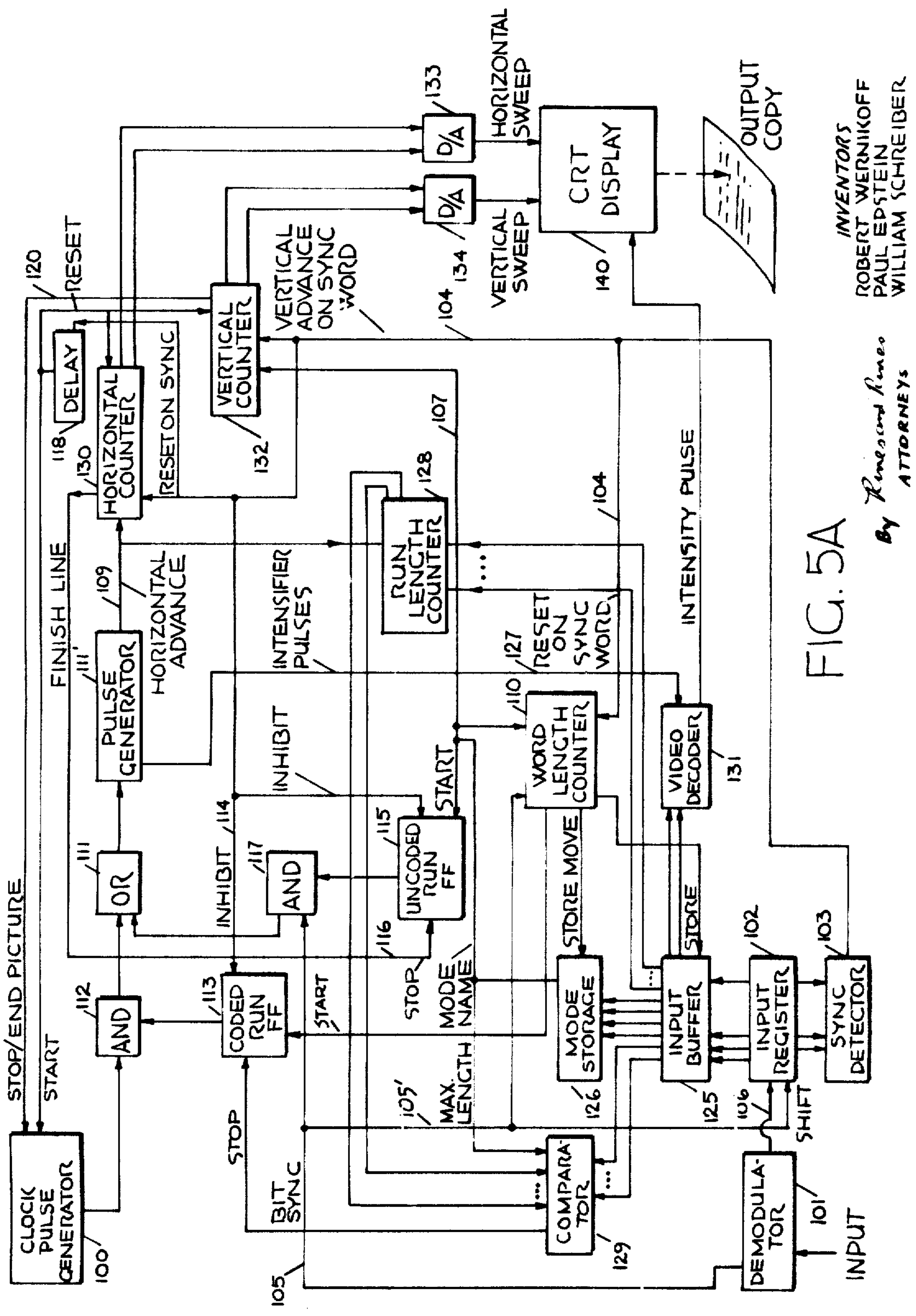

A successful simple version of a coder with such code-switching logic, that exhibits all the important features and advantages of the system of FIGS. 4, 4A and 4B, has been constructed in conjunction with a facsimile system for the transmission of black-and-white graphical material, with startling compression factors, and is schematically presented in FIGS. 5 and 5A.

The basic operation of the coded facsimile transmission apparatus of FIG. 5 is as follows. Using a cathode ray tube scanner 61, the machine causes the input copy (picture, drawing, document, or the like) to be examined in a line-by-line fashion, in much the same fashion as a television scan, but using cathode-ray deflection controlled by digital counters which may be stopped and started on command. If a line is scanned and found to be free of edges (edges are black-to-white or white-to-black transitions, as determined by video quantization and Boolean logic), a special word is transmitted, along with a uniquely-decipherable sync word to state that this line was blank. A properly constructed receiver understands these as well as other coded messages and uses the information to construct a facsimile of the original input. A line may also be found to have a non-zero number of edges. In this case, the machine selects one of several code algorithms, depending on which is optimum for the particular number of edges measured during the preliminary scan. A word is transmitted, for each line of scan in the present embodiment, along with the unique sync word which denotes the encoding procedure used to transmit the video information contained in the line. The line is scanned again during the transmission so as to use the input source itself as the information buffer.

With specific reference to FIG. 5, the operation of the machine is initiated by pushing a start button 50, causing a clock pulse generator 51 (as of the type described on pages 275–6 of Digital Modules (A705–A), published 1962 by the said Digital Equipment Corpration) to emit a pulse train that is divided by a factor $n$ in a divider 72, such as, for example, divider circuits of the type described on page 6.22 of the said System Modules text. The divided pulse train is applied at 52' to a word-length counter comparator 52 (similar to the comparator circuit 8 of FIG. 4, for example) to transmit word pulses at 53 to coincidence gates 54, causing a search flip-flop 55 to enable an AND gate 56 and to allow pulses to be distributed via an OR gate 57 and conductor 57' to the run-length counter 76. The output of the OR gate 57 also feeds a pulse generator 58 to generate intensifier pulses applied by way of conductor 58' to the cathode-ray-tube scanner 61 to provide light in the scanner 61 to scan the desired copy. The scanner 61 may be of any desired type such as, for example, the type described on pages 402–3 of the said Digital Modules text. The pulse generator 58 also supplies input at 58'' to the horizontal sweep counter 59, which count is converted into a cathode-ray-tube deflection or sweep signal by a digital-to-analog converter 60 as of, for example, the type described on pages 9.23–9.25 of the System Modules text.

A photomultiplier 61' receiving the light from the scanned copy, with its appropriate video quantizer produces video pulses that are applied at 62 to edge gates 63 where logical decisions (AND or OR) are made to determine when and if black-to-white or white-to-black transitions occur. The occurrence of edges is counted by an edge counter 64 whose output is compared with stored threshold values. Whenever a coincidence of number of edges and these stored values occurs, the threshold comparators 65 emit a pulse which is counted by an encoder selector counter 66. The contents of the encoder selector counter 66 is fed to an encoder selector buffer 67 via conductors 66' when the horizontal sweep counter 59 reaches a preset full count (i.e., end of horizontal scan), under the control of a pulse from the counter 59 via conductor 68 to the buffer 67.

While the search sweep and edge determination measurement is proceeding, the initialized encoder selector buffer 67 has allowed coincidence gates 54 to produce a pulse at 69, causing the sync word storage at 69' to be transferred to the output shift register 70, inserting the before-described uniquely-decipherable word. The output shift register 70, during the transmission, is shifted by pulses at 71 from the clock pulse generator 51, divided by a suitable constant $n$ at 72, depending upon the code and transmission line parameters. The coincidence gates 54, and a level set from the encoder selector counter 66 at gates 73, cause the appropriate word to be stored in the output shift register 70 to denote the encoding method or code which has been selected. If there were no edges, the coincidence gates 54 would cause the vertical sweep counter 74' to advance one count by feeding thereto a pulse at 74, simultaneously resetting the edge counter 64 at 74'' for the next search scan.

A blank line is reproduced at the receiver by decoding the word sent to denote the encoding method which was selected. If edges were encountered, the coincidence gates 54 would not cause the vertical counter 74' to advance, but would, at the proper word time as determined by the word length counter-comparator 52, set a code flip-flop 75 to allow pulses to pass through OR gate 57, with the subsequent operations described above. When an edge is not encountered, however, before the run-length counter 76 and coincidence gates 77 denote reaching of a full count (the full count length depending on the type of code selected), a pulse at 78 will reset the code flip-flop 75 and stop the pulse flow through 57. At the appropriate word time, a word is transmitted by a pulse at 84 from gates 83, conditioned by a word pulse from the comparator 52 along conductor 52'' and enabling level from the buffer 67. This word serves to tell the receiver that there is some distance to cover before an edge is encountered. When an edge is encountered, the coincidence of an enabling level at 79 and edge pulse at 80 in gate 81 causes a pulse at 82 to reset the code flip-flop 75, stopping the pulse flow through the OR gate 57. Again, at the appropriate time, a pulse at 84 causes an output word, this word describing the distance and kind of edge from the last space or edge word transmitted.

The remainder of the video edge information is transmitted in this fashion until the full horizontal scan count is reached which serves to start another search cycle at the appropriate time. The full horizontal sweep count pulse at 87 at this time resets all appropriate flip-flops and other circuits and causes, by appropriate coincidence in gate 85, the encoder selector buffer 67 to be reset to an appropriate value for the next horizontal-line scan operation. If the code selected is the "uncoded" or "null" code, the pulse rate passed by uncoded flip-flop 86 (set by coincidence gates 54) to the OR gate 57, is at the divide-by-$n$ rate so as to produce video information at the rate required by the transmission line. When the last horizontal line has been transmitted, the end of picture pulse at 88 stops the clock pulse generator 51, leaving the machine ready for the next picture transmission.

Figure 5B:
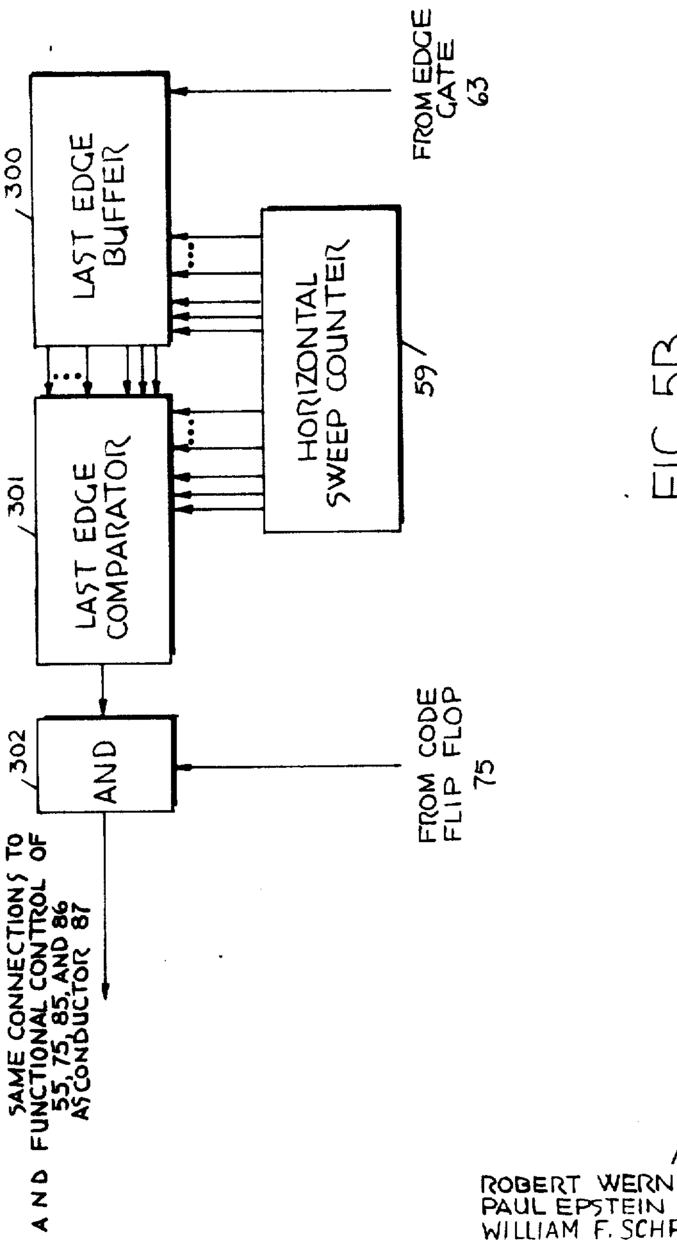
FIG. 5B is a circuit modification that may be employed with the system of FIG. 5.

If desired, a memory circuit buffer 300 may be connected to the horizontal sweep counter 59, as in FIG. 5B, to store the count at the time of the occurrence of the last black-to-white or white-to-black transition detected during the search scan and to stop the encoding during transmission when a last edge comparator 301 indicates equality with the current output of the horizontal sweep counter 59, so that no time is wasted with the rest of the line. Thus, each edge pulse at the gate 63 can so instruct the horizontal sweep counter to avoid transmission of blank line portions, producing an output pulse from an AND gate 302, connected also with the output of the code flip-flop 75, to produce the same functional control at the search flip-flop 55, the code flip-flop 75, the uncoded flip-flop 86 and the gate 85 as is effected by conductor 87 in the system of FIG. 5, for resetting at full count. This, of course, does not modify the receiving operation since the receiver starts a new line each time it receives the uniquely-decipherable sync word, but it further increases the efficiency of the system of FIG. 5.

The output shift register transmits the coded symbols to a line modulator 70' that, through any desired type of communication link, transmits to the receiving system.

The receiver mechanism of FIG. 5A is designed for the reconstruction of the facsimile transmission of the coded variety described in connection with FIG. 5. The receiver uses, for example, a cathode-ray tube 140 with appropriate amplifiers and logic to produce a facsimile of the original on a light-sensitive material or any other reproducing device.

As a general description, assume the receiver is waiting for a transmission to commence. Certain pulses keep a synchronism between the logic of the machine and the input over the line so that when a unique sync word appears, the machine is able to interpret it as such and to prepare its internal logic for the following operations. Upon receipt of the sync word, such as the uniquely-decipherable code-switching instructional word, certain "bits" are investigated to determine the proper mode of reception. When this is done, the bits are interpreted in M bit "words," where M is a variable depending on the chosen code. The words, in turn, inform the receiver as to where to place white and black on the reproduction so as to produce a facsimile copy. The exposures are made in a line-by-line fashion to reproduce as an output copy the scanned picture which the transmitter has "seen."

With reference to FIG. 5A, the detailed behavior of the receiving apparatus may be understood as follows. A clock 100 provides the pulses necessary for the higher speed computations and functions of the machine. The receiver demodulator 101 provides synchronizing pulses along 105 from the transmission line, and it provides message symbols from the line. These information bits are fed at 106 into an input register 102 which is shifted at the line bit rate (the line has all 1's or all 0's between transmissions), under the control of synchronizing pulses applied along 105 and conductor 105'.

The sync detector 103 (logical AND circuit) transmits a pulse along 104 to reset the word length counter 110 when the uniquely-decipherable sync word is encountered. After the bits denoting the following code are fully in position in the input register 102 (determined by counting a predetermined number of line pulses by the word length counter 110), the contents of the input register 102 are transferred into the input buffer 125. This serves as a temporary storage. The word is then stored in mode storage circuit 126, where the information is used to determine the means of further decoding. If the mode is determined to be the mode code denoting a blank line, the "mode name" line 107 connected to the mode storage circuit 126 applies a pulse to cause the vertical counter 132 to be advanced and the input shift register is shifted while the machine waits for the next sync word. If the mode word calls for a coded transmission, the word length counter 110 counts the number of bits to be used per word, based on the mode in use. The decoding of the words is done by transferring them into the input buffer 125 at appropriate times where a comparison can be made between the run-length counter 128 and the input buffer 125 by a logical comparison circuit 129. This comparator circuit 129 serves the purpose of allowing the horizontal counter 130 to advance only as far as the words specify. The horizontal advance pulses at 109 have passed through OR circuit 111 from the AND circuit 112 which is conditioned by clock pulses from clock pulse generator 100 and the coded run flip-flop 113, and trigger a pulse generator 111' for producing horizontal advance and intensifier pulses, later described. Run flip-flop 113 is started whenever a new word is read into input buffer 125 denoting a new word (unless the word is the uniquely-decipherable sync instruction word, in which case the run flip-flop 113 and uncoded run flip-flop 115 are inhibited by the sync word on line 114). Run flip-flop 115 is "started" by code name line 107 when the name reads "uncoded," and is "stopped" by completion of horizontal line count as on line 116. Run flip-flop 115 controls passage of pulses through AND circuit 117 into OR circuit 111 for subsequent horizontal count advancement at the uncoded rate equal to the line bit rate. Part of the word is decoded by video decoder 131 to produce the white or black intensities, as required, when supplied with the beforementioned intensifier pulses via conductor 127.

The decoding of words of length M continues until a sync word is received; at which time, the vertical counter 132 is advanced and a new sequence of operations occurs, as above. Both the horizontal counter 130 and the vertical counter 132 are connected to respective digital-to-analog converters 133 and 134 which deflect the cathode-ray display 140 (or control whatever other reproducer is employed) to produce the scanning. Delay unit 118 resets the counters 130 and 132 upon receipt of the first sync pulse in a transmission to provide "frame-sync." Further, delay 118 also starts the clock pulse generator 100 (or other required external logic or equipment) at the beginning of each transmission; the turn-off or stop of such devices being accomplished by picture completion pulses from the vertical counter 132 upon reaching a complete count via line 120.

The operation thus involves scanning the line once, for the code-switching computation, and then, having adjusted the coder-parameter to its correct value, scanning the line again to read it into the coder when necessary. In every other physical respect, however, the system of FIGS. 5 and 5A is a direct embodiment of the general system of FIGS. 4, 4A and 4B, and there is no logical difference between the same and such general system.

Further modifications, including other specific applications of the general coding method underlying the invention will occur to those skilled in the art; and all such are considered to fall within the spirit and scope of the invention as defined in the appended claims.

What is claimed is:

1. Communication apparatus having, in combination, means for accepting message symbols, means operable as successive message symbols are accepted for determining from a plurality of predetermined codes the particular code that produces the smallest number of symbols of coded representation thereof consistent with distortionless message transmission, encoder means connected to the accepting means and adapted to encode in any one of the predetermined codes, decision means operable when the determining means indicates a saving by using a different code for thereupon selecting such different code and causing the encoder means to encode in such different code, and means for transmitting the selected coded symbols.

2. Apparatus as claimed in claim 1 and in which means is provided responsive to the operation of the decision means for transmitting tagging symbols identifying the selected code.

3. Apparatus as claimed in claim 2 and in which means is provided for generating a uniquely-decipherable code-switching instruction word prior to the transmission of the said tagging symbols identifying the selected code.

4. Apparatus as claimed in claim 1 and in which storing means is provided for storing a group of message symbols prior to the code selection by the said decision means to enable determination of the said selected code.

5. Communication apparatus having, in combination, means for accepting message symbols, means operable as successive message symbols are accepted for determining from a plurality of predetermined codes the particular code that produces the smallest number of symbols of coded representation thereof consistent with distortionless message transmission, encoder means connected to the accepting means and adapted to encode in any one of the predetermined codes, decision means operable when the determining means indicates a saving by using a different code for thereupon selecting such different code and causing the encoder means to encode in such different code, means for transmitting the selected coded symbols, means for receiving the transmitted coded symbols and determining the predetermined selected code thereof, and decoding means connected with and responsive to the last-named means for reconstructing from the transmitted coded symbols the original message symbols.

6. Communication apparatus having, in combination, means for accepting message symbols, means operable as successive message symbols are accepted for determining from a plurality of predetermined codes the particular code that produces the smallest number of symbols of coded representation thereof consistent with distortionless message transmission, encoder means connected to the accepting means and adapted to encode any one of the predetermined codes, decision means operable when the determining means indicates a saving by using a different code for thereupon selecting such different code and causing the encoder means to encode in such different code, means for transmitting the selected coded symbols, means responsive to the operation of the decision means for transmitting tagging symbols identifying the selected code, means for receiving the transmitted coded symbols and determining from the tagging symbols the predetermined selected code thereof, and decoding means connected with and responsive to the last-named means for reconstructing from the transmitted code symbols the original message symbols.

7. Communication apparatus having, in combination, means for accepting message symbols, encoder means serving as a plurality of encoders each connected to the accepting means and adapted to encode in a different predetermined code, counter means serving as a corresponding plurality of counters, one connected with each encoder, for counting the numbers of symbols of coded representations of successive message symbols, comparator means for comparing the said numbers to determine the particular code that introduces the smallest number of symbols of said coded representation consistent with distortionless message transmission, decision mean operable when the comparator means indicates a saving by using a different code for thereupon selecting the corresponding encoder output, and means for transmitting the encoded symbols from the said selected encoder output.

8. Communications apparatus having, in combination, means for accepting message symbols, encoder means serving as a plurality of encoders each connected to the accepting means and adapted to encode in a different predetermined code, one of the plurality of encoders being a null encoder that reproduces in its output the original message symbols substantially without change, counter means serving as a corresponding plurality of counters, one connected with each encoder, for counting the numbers of symbols of coded representations of successive message symbols, comparator means for comparing the said numbers with the null encoder output to determine the particular code, if any, that introduces the smallest number of symbols of said coded representation consistent with distortionless message transmission, decision means operable when the comparator means indicates a saving by using a different code for thereupon selecting the corresponding encoder output, and means for transmitting the encoder symbols from the said selected encoder output.

9. Apparatus as claimed in claim 7 and in which input buffer means is provided between the accepting means and the encoder means for enabling the resetting of the apparatus after different encoder selections.

10. Apparatus as claimed in claim 7 and in which output buffer means is provided connected between encoder and the transmitting means, for storing the encoded symbols prior to transmission thereof.

11. Communication apparatus having, in combination, means for accepting message symbols, encoder means serving as a plurality of encoders each connected to the accepting means and adapted to encode in a different predetermined code, counter means serving as a corresponding plurality of counters, one connected with each encoder, for counting the numbers of symbols of coded representations of successive message symbols, comparator means for comparing the said numbers to determine the particular code that introduces the smallest number of symbols of said coded representation consistent with distortionless message transmission, decision means operable when the comparator means indicates a saving by using a different code for thereupon selecting the corresponding encoder output, means for transmitting the encoded symbols from the said selected encoder output, means for receiving the transmitted coded symbols and determining the predetermined selected code thereof, and decoding means connected with and responsive to the last-named means for reconstructing from the transmitted coded symbols the original message symbols.

12. Communication apparatus having, in combination, means for accepting message symbols, encoder means serving as a plurality of encoders each connected to the accepting means and adapted to encode in a different predetermined code, counter means serving as a corresponding plurality of counters, one connected with each encoder, for counting the numbers of symbols of coded representations of successive message symbols, comparator means for comparing the said numbers to determine the particular code that introduces the smallest number of symbols of said coded representation consistent with distortionless message transmission, decision means operable when the comparator means indicates a saving by using a different code for thereupon selecting the corresponding encoder output, means for transmitting the encoded symbols from the said selected encoder output, means responsive to the operation of the decision means for transmitting tagging symbols identifying the selected code, means for receiving the transmitted coded symbols and determining from the tagging symbols the predetermined selected code thereof, and decoding means connected with and responsive to the last-named means for reconstructing from the transmitted coded symbols the original message symbols.

13. Apparatus as claimed in claim 7 and in which means is provided responsive to the operation of the decision means for transmitting tagging symbols identifying the selected code.

14. Apparatus as claimed in claim 13 and in which means is provided for transmitting a uniquely-decipherable code-switching instruction word prior to the transmission of the tagging symbols identifying the selected code.

15. Apparatus as claimed in claim 14 and in which none of the codes of the encoder means produces the said uniquely decipherable word.

16. Apparatus as claimed in claim 8 and in which none of the codes of the encoder means produces the said uniquely decipherable word and means is provided for rapidly transmitting a tagging symbol specially identifying the null encoder upon receipt of such uniquely decipherable word to indicate continued operation in the null encoder mode.

17. Apparatus as claimed in claim 1 and in which the sequence of operation is substantially as set forth in the outline herein entitled "Coder Logic When Discriminant Equals H."

18. Apparatus as claimed in claim 1 and in which the sequence of operation is substantially as set forth in the outline herein entitled "Coder Logic When Discriminant Equals 2H."

19. Apparatus as claimed in claim 7 and in which the encoder and counter means comprise actual corresponding pluralities of encoders and counters.

20. Apparatus as claimed in claim 19 and in which there is provided a plurality of output buffers, one connected between each encoder and the transmitting means, for storing the encoded symbols prior to transmission thereof.

21 Communication apparatus having, in combination, means for accepting a plurality of message symbols, counter means operable as successive symbols are accepted for counting the numbers of the same, comparator means having a plurality of predetermined thresholds corresponding to predetermined codes and connected to the counter means to determine the particular code that produces the smallest number of symbols of coded representation of the message symbols consistent with distortionless transmission, encoder means adapted to encode in a plurality of different codes, and decision means operable when the comparator means indicates a final predetermined threshold for causing the encoder means to encode the symbols in the corresponding particular code, and means for transmitting the encoded symbols.

22. Apparatus as claimed in claim 21 and in which the encoder means comprises means for producing a plurality of different run-length codes and the decision means, when operated, selects the run-length code corresponding to the said final predetermined threshold.

23. Apparatus as claimed in claim 21 and in which means is provided responsive to the operation of the decision means for transmitting tagging symbols identifying the selected code.

24. Apparatus as claimed in claim 23 and in which means is provided for generating a uniquely decipherable code-switching instruction word prior to the transmission of the said tagging symbols identifying the selected code.

25. Communication apparatus having, in combination, means for accepting a plurality of message symbols, counter means operable as successive symbols are accepted for counting the numbers of the same, comparator means having a plurality of predetermined thresholds corresponding to predetermined codes and connected to the counter means to determine the particular code that produces the smallest number of symbols of coded representation of the message symbols consistent with distortionless transmission, encoder means adapted to encode in a plurality of different codes, decision means operable when the comparator means indicates a final predetermined threshold for causing the encoder means to encode the symbols in the corresponding particular code, means for transmitting the encoded symbols, means for receiving the transmitted coded symbols and determining the predetermined selected code thereof, and decoding means connected with and responsive to the last-named means for reconstructing from the transmitted coded symbols the original message symbols.

26. Communication apparatus having, in combination, means for accepting a plurality of message symbols, counter means operable as successive symbols are accepted for counting the numbers of the same, comparator means having a plurality of predetermined thresholds corresponding to predetermined codes and connected to the counter means to determine the particular code that produces the smallest number of symbols of coded representation of the message symbols consistent with distortionless transmission, encoder means adapted to encode in a plurality of different codes, decision means operable when the comparator means indicates a final predetermined threshold for causing the encoder means to encode the symbols in the corresponding particular code, means for transmitting the encoded symbols, means responsive to the operation of the decision means for transmitting tagging symbols identifying the selected code, means for receiving the transmitted coded symbols and determining from the tagging symbols the predetermined selected code thereof, and decoding means connected with and responsive to the last-named means for reconstructing from the transmitted coded symbols the original message symbols.

27. Apparatus as claimed in claim 21 and in which means is provided for preliminarily scanning each successive line of a picture and the like and generating a count of the transitions between black and white portions thereof along such line, and means for thereupon re-scanning each successive line to generate the said message symbols.

28. Apparatus as claimed in claim 27 and in which the comparator means during such preliminary scanning selects a code algorithm depending upon the optimum code for the number of transitions in such line counted during such preliminary scan by the scanning means.

29. Apparatus as claimed in claim 28 and in which means is provided responsive to the count during the said preliminary scan for transmitting a uniquely decipherable code-switching instruction word and a tagging symbol identifying the selected code prior to the transmission of the properly coded message symbols resulting from the encoding of the symbols produced during the said rescanning.

30. Apparatus as claimed in claim 28 and in which the scanning means comprises a cathode-ray-tube device.

31. Apparatus as claimed in claim 29 and in which there is provided means for receiving the transmitted coded symbols and determining the predetermined selected code thereof, and decoding means connected with and responsive to the last-named means for reconstructing from the transmitted coded symbols the original message symbols.

32. Apparatus as claimed in claim 29 and in which there is provided means responsive to the operation of the decision means for transmitting tagging symbols identifying the selected code, means for receiving the transmitted coded symbols and determining from the tagging symbols the predetermined selected code thereof, and decoding means connected with and responsive to the last-named means for reconstructing from the transmitted coded symbols the original message symbols.

33. Apparatus as claimed in claim 27 and in which means is provided responsive to a last transition detected in a line scan for avoiding the transmission of further blank-line portions of the line.

34. Apparatus as claimed in claim 1 and in which there is provided means responsive to the operation of the said decision means for transmitting tagging symbols identifying the selected code, and means for controlling the said decision means to select a different code only when there is a saving in transmission time by changing to the different code as compared with the transmission time of the tagging symbol representing the selection of said different code.

35. Apparatus as claimed in claim 1 and in which the said determining means is provided with means for allowing sufficient message symbols to be accepted during the transmitting of a block of the said selected coded symbols to enable the determining and decision means to decide what code should be next used before the end of the transmitting of the said block of selected coded signals.

References Cited

UNITED STATES PATENTS

| | | | |
|---|---|---|---|
| 3,267,439 | 8/1966 | Bonner | 340—172.5 |
| 3,228,004 | 1/1966 | McGregor | 340—172.5 |
| 3,202,982 | 8/1965 | Whitney | 340—347 |
| 3,147,343 | 9/1964 | Meyer et al. | 179—1 |
| 3,121,860 | 2/1964 | Shaw | 340—172.5 |
| 3,051,929 | 8/1962 | Smith | 340—172.5 |
| 2,953,777 | 9/1960 | Gridley | 340—347 |
| 2,933,563 | 5/1960 | Hohmann | 179—18 |

ROBERT C. BAILEY, *Primary Examiner.*

GARETH D. SHAW, *Assistant Examiner.*